(12) United States Patent
Nagao

(10) Patent No.: US 12,072,682 B2
(45) Date of Patent: Aug. 27, 2024

(54) SUPPORT DEVICE AND STORAGE MEDIUM

(71) Applicant: OMRON CORPORATION, Kyoto (JP)

(72) Inventor: Kenjiro Nagao, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 411 days.

(21) Appl. No.: 17/615,951

(22) PCT Filed: Mar. 10, 2020

(86) PCT No.: PCT/JP2020/010380
§ 371 (c)(1),
(2) Date: Dec. 2, 2021

(87) PCT Pub. No.: WO2020/246097
PCT Pub. Date: Dec. 10, 2020

(65) Prior Publication Data
US 2022/0326673 A1 Oct. 13, 2022

(30) Foreign Application Priority Data
Jun. 7, 2019 (JP) ................. 2019-106980

(51) Int. Cl.
*G06F 9/00* (2018.01)
*G05B 19/042* (2006.01)
(52) U.S. Cl.
CPC .......... *G05B 19/0426* (2013.01); *G05B 2219/23011* (2013.01)

(58) Field of Classification Search
CPC ........................................................ G06F 9/00
See application file for complete search history.

(56) References Cited

U.S. PATENT DOCUMENTS 9,182,948 B1    11/2015   O'Riordan
10,268,764 B2 *   4/2019   Matsuo ............... G06F 16/951
2004/0230322 A1   11/2004   Oka et al.
(Continued)

FOREIGN PATENT DOCUMENTS

CN    102308263 A    1/2012
CN    104204975 A    12/2014
(Continued)

OTHER PUBLICATIONS

Extended European Search Report dated Mar. 1, 2023 in EP Application No. 20817840.0.
(Continued)

*Primary Examiner* — Jae U Jeon
(74) *Attorney, Agent, or Firm* — Sughrue Mion, PLLC

(57) ABSTRACT

A support device that supports development of a sequence program executed by a control device includes an operation reception module that receives an operation on the support device, and setting module that sets a switching option of a display mode for a call instruction selected from call instructions of a unit program in the sequence program in accordance with the operation received. When the sequence program is displayed, the call instruction is switched to an image of a circuit configuration represented by a sequence logic defined by a corresponding unit program based on the option set and displayed.

7 Claims, 18 Drawing Sheets

(56) References Cited

U.S. PATENT DOCUMENTS

| | | | |
|---|---|---|---|
| 2008/0127065 A1 | 5/2008 | Bryant et al. | |
| 2011/0295388 A1* | 12/2011 | Iwata | G05B 19/056 700/18 |
| 2015/0301923 A1 | 10/2015 | Yamaoka | |
| 2016/0132305 A1 | 5/2016 | Morota et al. | |
| 2016/0267001 A1* | 9/2016 | Yonekura | G06F 11/30 |
| 2017/0083017 A1* | 3/2017 | Ino | G05B 19/406 |
| 2019/0018387 A1 | 1/2019 | Nagao | |
| 2019/0236233 A1 | 8/2019 | Horikawa | |

FOREIGN PATENT DOCUMENTS

| | | |
|---|---|---|
| CN | 105144004 A | 12/2015 |
| CN | 108780306 A | 11/2018 |
| CN | 109690426 A | 4/2019 |
| JP | 08-166807 A | 6/1996 |
| JP | 2001-005517 A | 1/2001 |
| JP | 2004-280341 A | 10/2004 |
| JP | 2004-295872 A | 10/2004 |
| JP | 2005-38260 A | 2/2005 |
| JP | 2009-122936 A | 6/2009 |
| WO | 2010/089862 A1 | 8/2010 |
| WO | 2018/051441 A1 | 3/2018 |

OTHER PUBLICATIONS

International Search Report of PCT/JP2020/010380 dated Jun. 9, 2020 [PCT/ISA/210].

Written Opinion of PCT/JP2020/010380 dated Jun. 9, 2020 [PCT/ISA/237].

Office Action issued Feb. 8, 2024 in Chinese Application No. 202080039324.X.

Communication issued Jun. 19, 2024 by Chinese Patent Office in Application No. 202080039324.X.

\* cited by examiner

FIG.7

| CALL NAME (2731) | LOCATION (2732) | ASYNCHRONOUS FLAG (2733) | ... |
|---|---|---|---|
| N1 | L1 | 0 | ... |
| N2 | L2 | 1 | ... |
| : | : | : | : |

| DEFINITION NAME (2741) | DEFINITION ASYNCHRONOUS FLAG (2742) | ... |
|---|---|---|
| D1 | 0 | ... |
| D2 | 1 | ... |
| : | : | : |

274

277 → D1
277 → D2

SUPPORT DEVICE AND STORAGE MEDIUM

CROSS REFERENCE TO RELATED APPLICATIONS

This application is a National Stage of International Application No. PCT/JP2020/010380, filed Mar. 10, 2020, claiming priority to Japanese Patent Application No. 2019-106980, filed Jun. 7, 2019, the entire contents of each of which being herein incorporated by reference in their entireties.

TECHNICAL FIELD

The present disclosure relates to a support device that supports development of a control program executed by a control device that controls a control target, and a support program for implementing the support device.

BACKGROUND ART

In various manufacturing sites, control devices such as a programmable logic controller (PLC) have been introduced. Such a control device is a kind of computer, and a control program included in a user program designed to adapt to a manufacturing device, manufacturing equipment, or the like is executed. Such a control program is created in a development environment prepared separately from the control device. A device responsible for providing the development environment and a function of uploading the control program to the control device or downloading the control program to the control device is also referred to as a support device. The control program includes a sequence program representing a control sequence.

In the sequence program, common sequence logic is prepared as a function block representing the logic, and a call instruction of the function block is written in the sequence program, so that the function block can be made into a component and reused, and the development efficiency of the program can be increased.

For example, Japanese Patent Laying-Open No. 2001-5517 (PTL 1) discloses a device that displays a control logic diagram that is the basis of a program running on a controller and that is described using a function block, and an execution state of the program in the controller with the control logic diagram and the execution state associated with each other.

Further, Japanese Patent Laying-Open No. 2004-295872 (PTL 2) discloses a method for editing a user program that can be edited through online edit regardless of where an object to be edited of the user program is located or even when there are many portions to be edited (including the edit of a function block).

CITATION LIST

Patent Literature

PTL 1: Japanese Patent Laying-Open No. 2001-5517
PTL 2: Japanese Patent Laying-Open No. 2004-295872

SUMMARY OF INVENTION

Technical Problem

When the sequence program is displayed with the function block made into a component as described above, an abstract image of the function block is displayed at the call instruction part of the function block. This brings about an advantage that a list of programs can be displayed even in a limited display area. On the other hand, for program development, there has been a demand for editing a program while confirming logic code actually written in the function block on the same screen together with other code of the sequence program, but PTL 1 and PTL 2 have no proposal for this demand.

It is therefore an object of the present disclosure to provide an environment that can effectively support development of a sequence program.

Solution to Problem

According to an example of the present disclosure, provided is a support device that supports development of a sequence program executed by a control device that controls a control target, the support device including an operation reception unit configured to receive an operation on the support device, and a setting unit configured to set a switching option of a display mode for at least one call instruction selected from call instructions of a unit program in the sequence program in accordance with the operation received. When the sequence program is displayed, the at least one call instruction is switched to an image of a circuit configuration represented by a sequence logic defined by a corresponding unit program based on the option set and displayed.

According to this disclosure, it is possible to display, when the sequence program is displayed, the image of the circuit configuration represented by the sequence logic defined by the corresponding unit program as a call instruction for the at least one control instruction selected from at least one call instruction in the sequence program based on the set option.

In the above-described disclosure, the support device further includes a monitor configured to acquire a circuit output state indicating an execution state of the sequence program from the control device and visualize the execution state of the sequence program in the control device based on sequence circuit information defining a circuit configuration of the sequence program and the circuit output state acquired.

According to this disclosure, it is possible to visualize the execution state of the sequence program in the control device using the display of an output state of a circuit represented by the sequence logic.

In the above-described disclosure, the circuit output state includes a circuit output state indicating an execution state of the at least one unit program selected, and the monitor visualizes the circuit output state indicating the execution state of the at least one unit program in the image of the circuit configuration of the unit program.

According to this disclosure, it is possible to visualize the output state of the circuit in the image of the circuit configuration represented by the sequence logic defined by the unit program selected based on the set option in the sequence program in the control device.

In the above-described disclosure, the support device further includes an editor configured to edit the sequence program. The editor edits the sequence logic defined by the unit program based on an operation of changing the image of the circuit configuration of the unit program.

According to this disclosure, it is possible to edit, when the operation is performed on the image of the circuit configuration of the unit program, the sequence logic defined by the unit program in accordance with details of the operation on the image.

In the above-described disclosure, the option set for the at least one call instruction is enabled or disabled in accordance with the operation received.

According to this disclosure, the user can switch between enabling the option by further inputting an operation with the option set, that is, displaying the image of the circuit configuration represented by the sequence logic defined by the corresponding unit program as the call instruction and disabling the option, that is, making the original call instruction left unchanged.

In the above-described disclosure, the support device further includes an editor configured to edit the sequence program. The setting unit sets the switching option when the sequence program is edited.

According to this disclosure, it is possible to set the switching option when the sequence program is edited.

According to an example of the present disclosure, provided is a support program for supporting development of a sequence program executed by a control device that controls a control target, the support program causing a computer to execute receiving an operation on the computer, setting a switching option of a display mode for at least one call instruction selected from call instructions of a unit program in the sequence program in accordance with the operation received, and switching, when the sequence program is displayed, the at least one call instruction to an image of a circuit configuration represented by a sequence logic defined by a corresponding unit program based on the option set and displaying switched the image of a circuit configuration.

According to this disclosure, upon execution of the support program by the computer, it is possible to display, when the sequence program is displayed, the image of the circuit configuration represented by the sequence logic defined by the corresponding unit program as a call instruction for the at least one control instruction selected from at least one call instruction in the sequence program based on the set option.

Advantageous Effects of Invention

According to an example of the present disclosure, provided is an environment that can effectively support the development of a sequence program.

BRIEF DESCRIPTION OF DRAWINGS

FIG. 7 is a diagram schematically illustrating an example of a local flag table 273 according to the embodiment of the present invention.

FIG. 8 is a diagram schematically illustrating an example of a definition flag table 274 according to the embodiment of the present invention.

DESCRIPTION OF EMBODIMENTS

Figure 1:
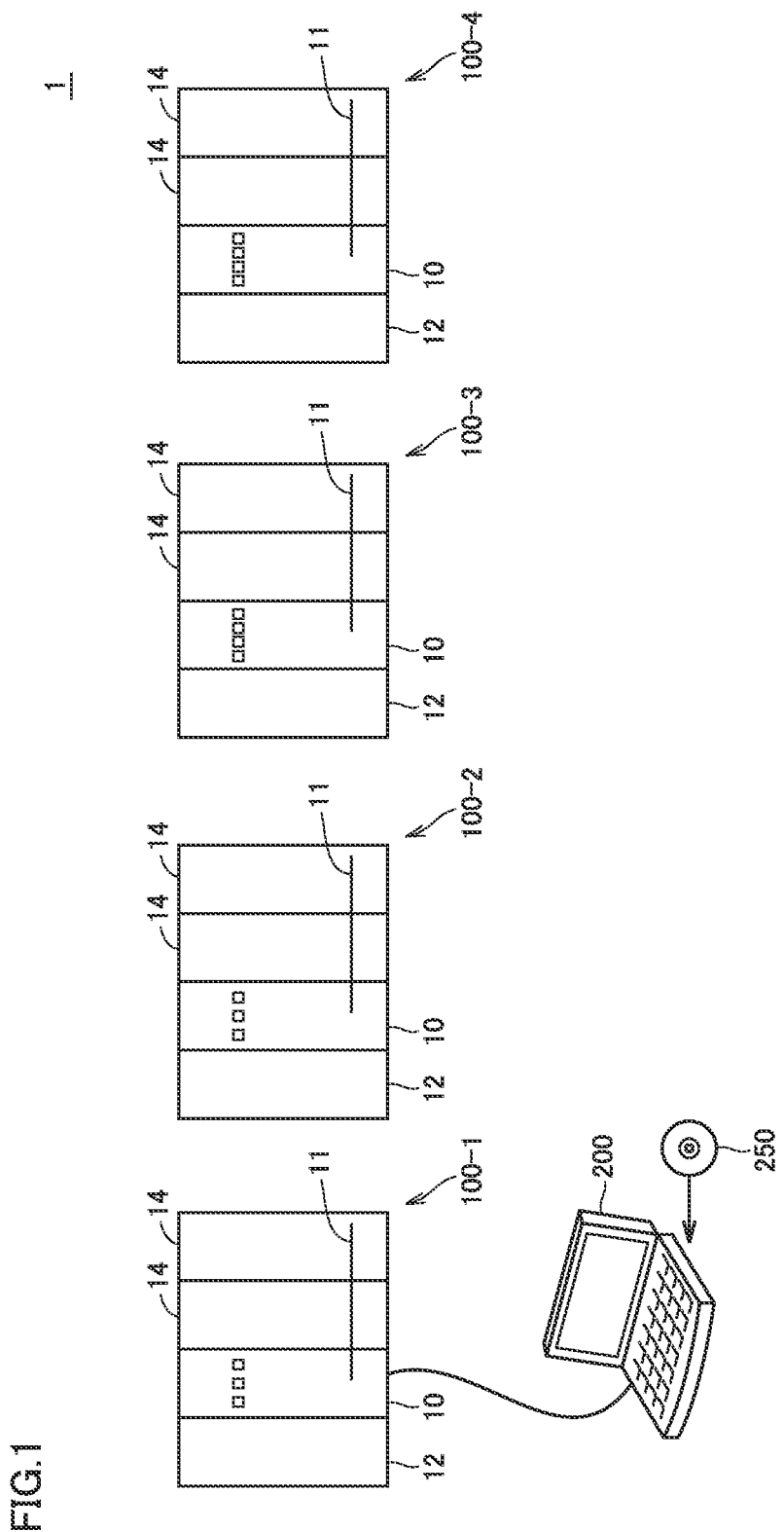
FIG. 1 is a diagram illustrating an example of a configuration of a PLC system 1 to which a support device 200 according to an embodiment of the present invention is applicable.

Embodiments according to the present invention will be described in detail with reference to the drawings. Note that the same or corresponding parts in the drawings are denoted by the same reference numerals, and no redundant description will be given of such parts.

§. Application Example

Figure 21:
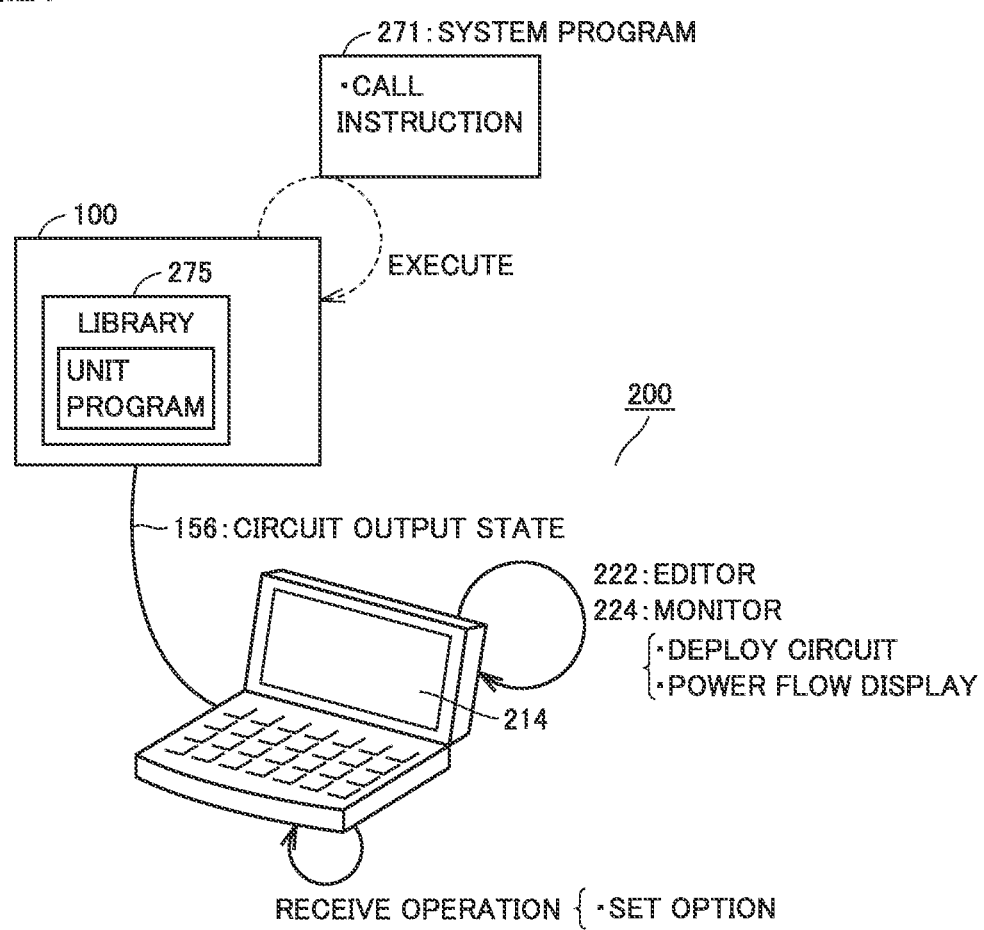
FIG. 21 is a diagram for schematically describing an application example of the present disclosure.

First, an example of a case to which the present invention is applied will be described. FIG. 21 is a diagram for schematically describing an application example of the present disclosure. Referring to FIG. 21, a support device 200 according to the present disclosure is connectable to a control device that controls an object such as manufacturing equipment at a manufacturing site. The two communicate with each other over, for example, a universal serial bus (USB). Support device 200 provides an environment for supporting the development of a control program executed by the control device. In the following description, a PLC 100 will be given as a typical example of the control device, but the control device is not limited to the PLC.

Support device 200 provides an environment for developing various user programs including the control program. The programs to be developed may include, for example, a program conforming to International Standard IEC61131-3. In the international standard IEC61131-3, as a programming language for a PLC application including the control program, five types including a ladder diagram (LD), a function block diagram (FBD), a sequential function chart (SFC), an instruction list (IL), and a structured text (ST) are defined. The control program according to the present embodiment is a sequence program 271 that may be written in any programming language. A description will be given below of sequence program 271 written in a ladder diagram as a typical example.

PLC 100 includes a library 275 that stores executable code of a plurality of unit programs including functions and function blocks. Sequence program 271 includes a call instruction that calls one or a plurality of unit programs making up sequence program 271. Therefore, when PLC 100 executes the call instruction during execution of sequence program 271, a corresponding unit program is called from library 275 and executed.

Support device 200 provides an environment for developing sequence program 271 executed by PLC 100. Support device 200 includes, as a development environment, an editor 222 that creates or edits sequence program 271, for example. Editor 222 edits, upon receipt of a user operation via an input unit such as a keyboard, sequence program 271 in accordance with the user operation thus received. During this edit, for example, editor 222 sets a switching option of a display mode on a display 214 for at least one call instruction selected from the call instructions of the unit program in sequence program 271 in accordance with the received user operation.

When sequence program 271 is displayed on display 214, monitor 224 switches the at least one call instruction included in sequence program 271 to an image of a circuit configuration represented by a sequence logic defined by a corresponding unit program based on the option set for the call instruction and displays the image.

This allows, for example, during edit of sequence program 271, a unit program being called to be deployed into a circuit represented by a sequence logic defined by the unit program and displayed. This makes it possible to grasp the sequence logic code actually written in the unit program being called by the call instruction in the form of a sequence circuit at a development site such as when editing sequence program 271.

Further, monitor 224 of support device 200 acquires a circuit output state 156 indicating an execution state of sequence program 271 from PLC 100 and enables a power flow display where the circuit output state thus acquired is visualized in the circuit deployed for the unit program. This allows, during the edit of sequence program 271 by editor 222, visual confirmation of the operation of the sequence circuit represented by the unit program. Therefore, the power flow display can provide support information for the user to determine whether the sequence logic written in the unit program is suitable.

A description will be given below of, as a more specific application example of the present invention, a more detailed configuration and processing of support device 200 according to the present embodiment.

<A. Software Configuration>

Figure 6:
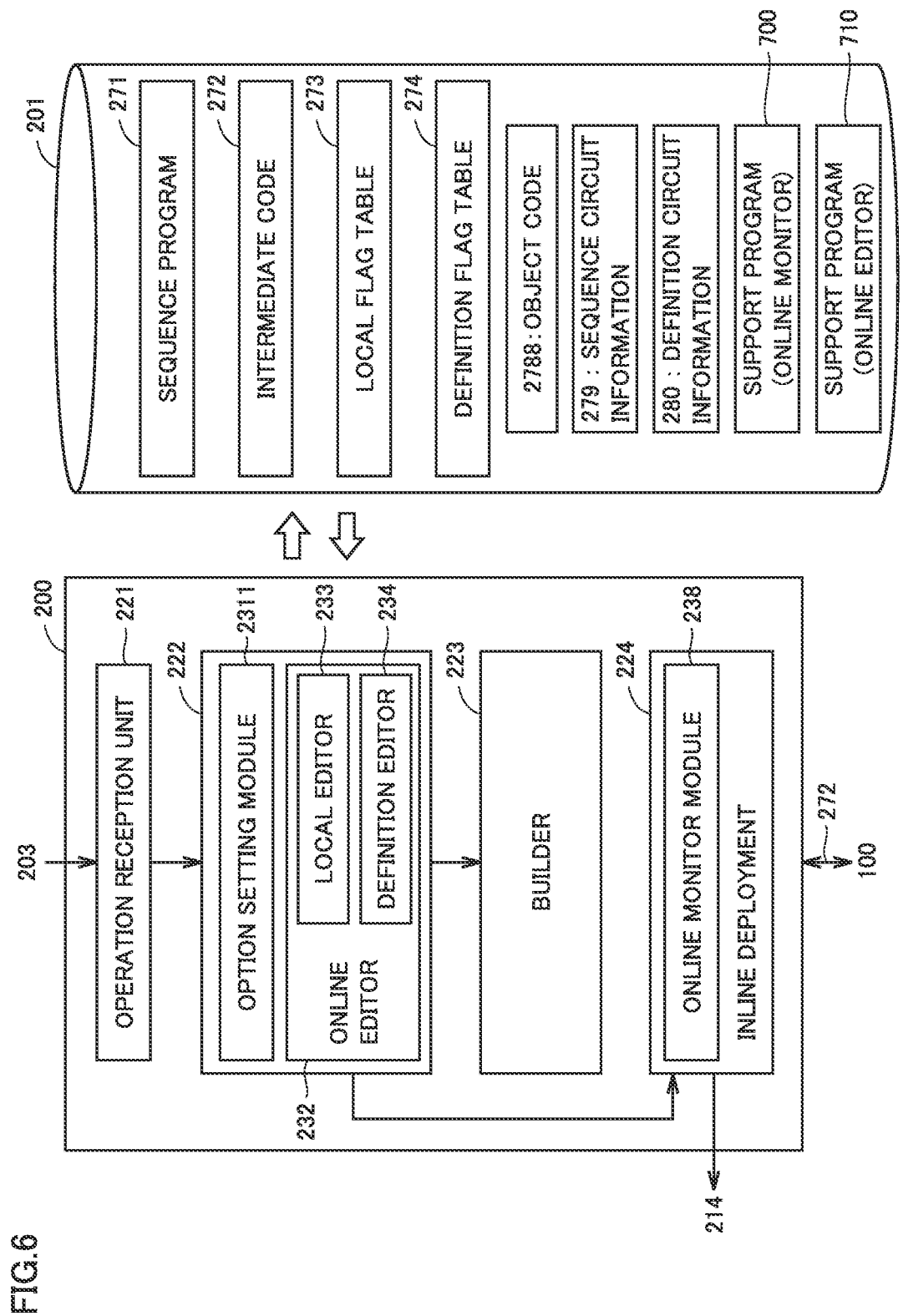
FIG. 6 is a diagram schematically illustrating an example of a software configuration of support device 200 according to the embodiment of the present invention.

A software configuration for implementing the above-described application example will be described. FIG. 6 is a diagram schematically illustrating an example of a software configuration of support device 200 according to the embodiment of the present invention.

Under this software configuration, there is provided an "online monitor" capable of monitoring an execution state, in the control device, of a user program (sequence program 271) created as desired to adapt to a control target. There is further provided an "online editor" that is a function of editing and updating the user program (sequence program 271) in the execution state with sequence program 271 running on the control device. The online monitor is a concept including the power flow display described above.

FIG. 6 illustrates a software configuration of support device 200 with relevance to data exchange with PLC 100. Referring to FIG. 6, support device 200 generates intermediate code 272 from sequence program 271 and transfers intermediate code 272 thus generated to PLC 100. PLC 100 converts intermediate code 272 received from support device 200 into native code. An operation processor of PLC 100 executes the native code. The control target is controlled through the execution of the native code. Sequence program 271 includes call instruction parts that call unit programs making up sequence program 271. According to the present embodiment, a FUN/FB definition, which is a definition of a function (FUN) or a function block (FB), will be given as an example of the unit program. The FUN/FB definition is stored in a library or the like of PLC 100 as a common component for increasing the efficiency of coding of sequence program 271. When sequence program 271 is executed, the FUN/FB definition is called from the library as needed, and a defined sequence logic of the called FUN/FB definition is executed. Note that according to the present embodiment, a circuit configuration is defined by a sequence logic in accordance with the above-described ladder diagram, while the definition details of the unit program depends on the specification of the programming language used for coding a corresponding unit block. This circuit configuration primarily includes a logical circuit configuration.

Further, support device 200 stores, in a storage unit 201, object code 2788 for implementing a screen display by monitor 224 of support device 200. Storage unit 201 of support device 200 further stores sequence circuit information 279 and definition circuit information 280 that are generated from the user program for PLC 100 and define the circuit configuration of the sequence program. Definition circuit information 280 shows a circuit configuration defined by the above-described FUN/FB definition.

Support device 200 includes editor 222 for creating sequence program 271. During edit, an option setting module 2311 included in editor 222 selects, in accordance with a user operation received by an operation reception unit 221 from an operation unit 203, at least one call instruction from call instructions of a unit program in sequence program 271, and sets a switching option of a display mode for the selected call instruction.

Therefore, during edit, addition, deletion, change, or the like of instruction code is made with sequence program 271 displayed by monitor 224. In this case, the at least one call instruction is switched to an image of a circuit configuration represented by the sequence logic defined by a corresponding unit program based on the option thus set. Accordingly, the circuit configuration defined by the unit program is inline-deployed as the call instruction of the unit program. As described above, selectively setting the option for the at least one call instruction part via a user operation causes a circuit configuration defined by a corresponding unit program to be visualized in the at least one call instruction part.

Such visualization is also made during online edit. A local editor 233 of online editor 232 edits (changes) sequence program 271 in accordance with an operation of changing the image of the inline-deployed circuit configuration of sequence program 271. A definition editor 234 edits (changes) the definition details (sequence logic) of the FUN/FB definition stored in the library of PLC 100 in accordance with the operation of changing the image of the inline-deployed circuit configuration.

Support device 200 further includes an online monitor module 238 for providing an online monitor. Online monitor module 238 acquires, from PLC 100, a circuit output state 156 (to be described later) indicating the execution state of the native code. That is, support device 200 (online monitor module 238) exchanges circuit output state 156 with PLC 100. Online monitor module 238 of support device 200 visualizes the execution state of the sequence program in PLC 100 based on sequence circuit information 279, definition circuit information 280, and circuit output state 156 thus acquired (that is, provides an online monitor). This visualization of the execution state provides information for supporting the user in making a determination whether to edit (change) the sequence logic.

The use of such an editor having an inline deployment option and an online monitor that visualizes the execution state in PLC 100 provides an environment for effectively supporting the development of a unit program, the development of a sequence program, and the like.

A description will be given below of, as a more specific application example of the present invention, a more detailed configuration and processing of support device 200 according to the present embodiment.

<B. System Configuration>

FIG. 1 is a diagram illustrating an example of a configuration of a PLC system 1 to which support device 200 according to the present embodiment is applicable.

Referring to FIG. 1, PLC system 1 includes a plurality of PLCs 100-1, 100-2, 100-3, 100-4, . . . (hereinafter, correctively referred to as "PLC 100"). Each PLC 100 is an example of the control device controlling the control target that is a field device such as a relay or a sensor. Support device 200 is connectable to PLC 100 and provides an environment for supporting the development of the control program for PLC 100. PLC system 1 may include only one PLC 100. For the sake of simplicity, a development environment adapted to single PLC 100 will be described below.

PLC 100 generally includes a CPU unit 10 serving as a main unit that executes various programs including the control program, a power supply unit 12 that supplies power to CPU unit 10 and the like, and an input/output (I/O) unit 14 that exchanges signals with a field. I/O unit 14 is connected to CPU unit 10 over a system bus 11.

The development support environment provided by support device 200 may have an editor (edit), a debugger, and a simulator for the control program, a monitor function of outputting information output from the editor, the debugger, or the simulator to a monitor such as a display, and the like. Support device 200 further has a function of acquiring the state value of PLC 100 in operation and outputting the state value to the monitor such as a display.

When a support program, which is an application program stored in a recording medium 250, is installed in support device 200, various functions for the development support environment as described above are made available. Instead of recording medium 250, the support program may be downloaded from an external server device or the like over a network. For example, support device 200 is connected to CPU unit 10 of PLC 100 through a connection cable. Support device 200 is typically implemented by a personal computer.

<C. Example of Hardware Configuration of PLC 100>

Figure 2:
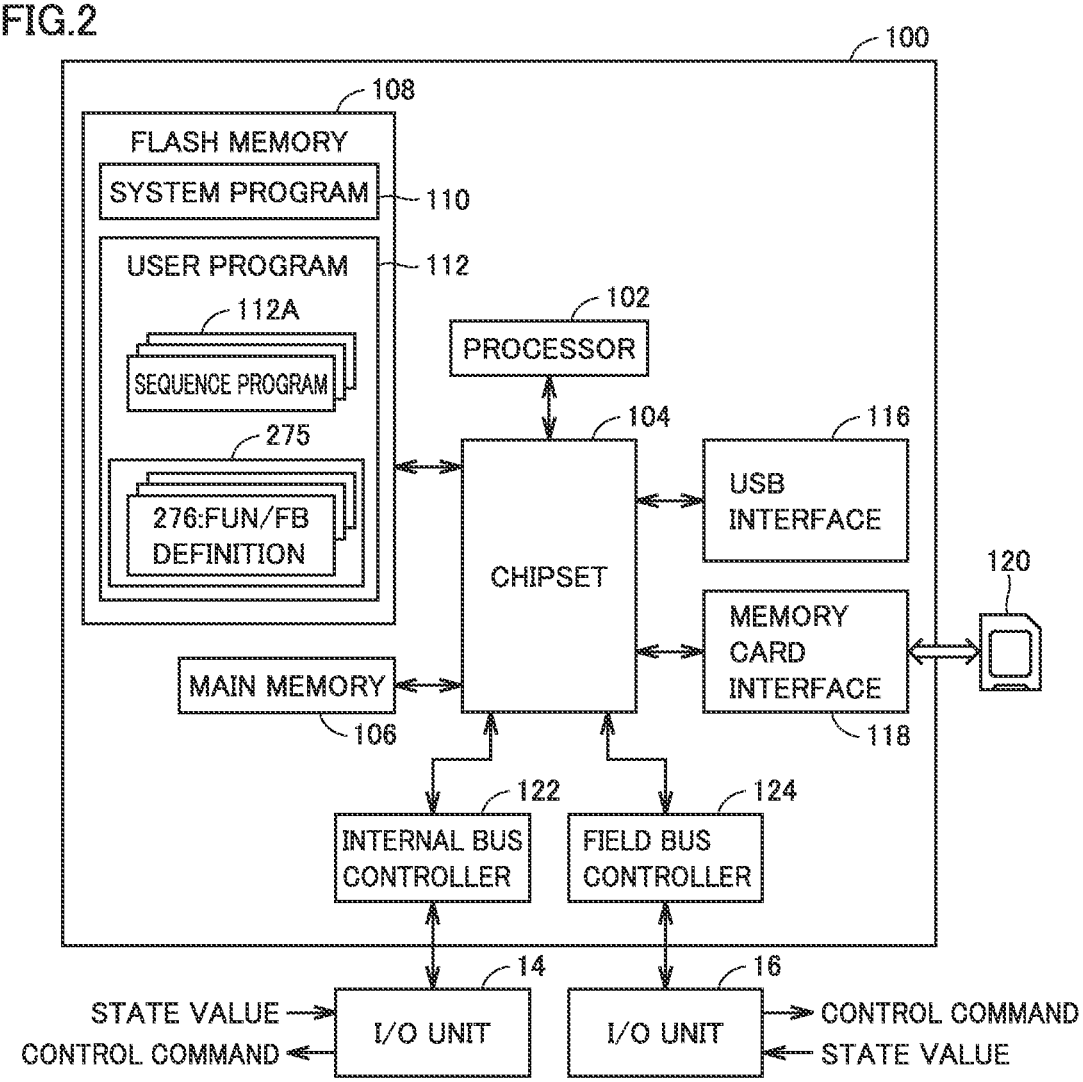
FIG. 2 is a diagram schematically illustrating an example of a hardware configuration of a PLC 100 that is a part of the PLC system illustrated in FIG. 1.

Next, an example of the hardware configuration of PLC 100 will be described. FIG. 2 is a diagram schematically illustrating an example of the hardware configuration of PLC 100 that is a part of the PLC system illustrated in FIG. 1.

Referring to FIG. 2, PLC 100 causes a processor to execute a program installed in advance to control the control target. More specifically, PLC 100 includes a processor 102 such as a central processing unit (CPU) or a micro-processing unit (MPU), a chipset 104, a main memory 106, a flash memory 108, a USB interface 116, a memory card interface 118, an internal bus controller 122, and a field bus controller 124. Flash memory 108 stores a system program 110 and a user program 112.

Processor 102 reads system program 110 and user program 112 stored in flash memory 108, deploys system program 110 and user program 112 on main memory 106, and executes system program 110 and user program 112 to control the control target. Herein, the "control program" is a kind of program designed, as desired, to adapt to the control target and is a concept including system program 110 and user program 112. For actual implementation, the control program, however, may include only user program 112.

System program 110 includes instruction code for providing basic functions of PLC 100 such as data input/output processing and execution timing control. User program 112 includes a sequence program 112A (corresponding to sequence program 271) and library 275 for executing sequence control. Library 275 includes various functions and at least one FUN/FB definition 276 that can be called from sequence program 112A during the execution of sequence program 112A.

Note that user program 112 may include other programs such as a motion program, but a description of the present embodiment will mainly focus on sequence program 112A. Further, according to the present embodiment, sequence program 112A includes a "ladder program" in which operation instruction code represented by a ladder logic circuit (logic circuit) or a combination of ladder logic circuits is written in, for example, a ladder language defined by IEC61131-3 or the like.

FUN/FB definition 276 in library 275 represents definition details of FUN or FB. FUN or FB defined by FUN/FB definition 276 corresponds to a unit program (hereinafter, referred to as a program organization unit (POU) that is a part of the sequence program. Code of the sequence logic defined by FUN or FB represents a sequence logic circuit (for example, a ladder logic circuit) made up of a logic circuit or a combination of logic circuits.

Chipset 104 controls each component to implement processing on entire PLC 100.

Internal bus controller 122 is an interface that exchanges data with I/O unit 14 connected to PLC 100 over an internal bus. Field bus controller 124 is an interface that exchanges data with I/O unit 16 connected to PLC 100 over a field bus (not illustrated). Internal bus controller 122 and field bus controller 124 each acquire a state value input to a corresponding one of I/O units 14, 16 and output a result of operation made by processor 102 as a command value from the corresponding one of I/O units 14, 16.

Universal serial bus (USB) interface 116 controls data exchange over USB. Support device 200 communicates with PLC 100 via USB interface 116. Memory card interface 118 is configured to receive a memory card 120 in a detachable manner and can write and read data to and from memory card 120.

FIG. 2 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of PLC 100 may be implemented by hardware having a general-purpose architecture (for example, an industrial personal computer based on a general-purpose personal computer). Further, a plurality of operating systems (OSs) having different uses may be executed in parallel using a virtualization technology, and a necessary application may be executed on each OS.

<D. Example of Hardware Configuration of Support Device 200>

Figure 3:
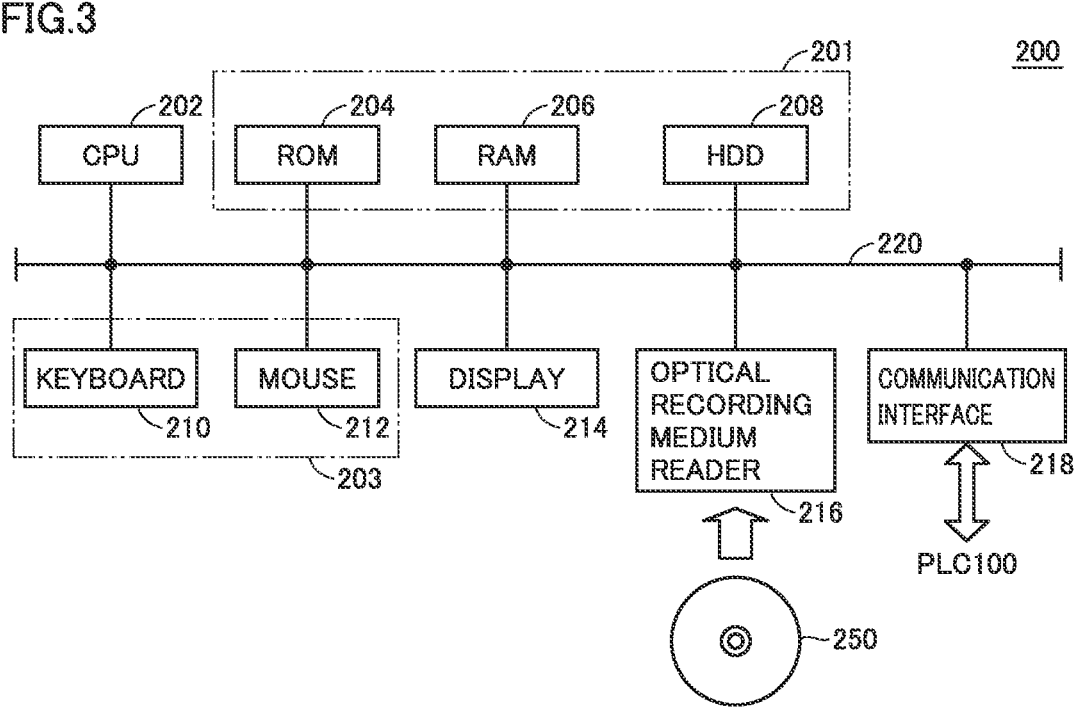
FIG. 3 is a diagram schematically illustrating an example of a hardware configuration of support device 200 according to the embodiment of the present invention.

FIG. 3 is a diagram schematically illustrating an example of a hardware configuration of support device 200 according to the embodiment of the present invention. Referring to FIG. 3, support device 200 is typically implemented by a general-purpose computer. Note that, from the viewpoint of maintainability at a manufacturing site where PLC 100 is installed, a laptop personal computer having excellent portability is preferable.

Support device 200 includes storage unit 201 and CPU 202 that executes various programs including an operating system (OS). Storage unit 201 includes a read only memory (ROM) 204 that stores BIOS and various data, a random access memory (RAM) 206 that provides a work area for storing data necessary for execution of a program by CPU 202, and a hard disk (HDD) 208 that stores a program executed by CPU 202 in a non-volatile manner.

Support device 200 further includes operation unit 203 including a keyboard 210 and a mouse 212 operated by the user to input an instruction to support device 200, and display 214 for presenting information to the user. Support device 200 includes a communication interface 218 that communicates with PLC 100 (CPU unit 10) and the like. Communication interface 218 may include a USB communication module to communicate with USB interface 116.

Support device 200 includes an optical recording medium reader 216 that reads, from recording medium 250, a support program for providing the development support environment stored in recording medium 250.

FIG. 3 illustrates a configuration example where a processor such as CPU 202 executes a program to provide necessary functions, but some or all of the functions thus provided may be implemented by a dedicated hardware circuit (for example, an ASIC or an FPGA). Further, a plurality of OSs having different uses may be executed in parallel using a virtualization technology, and a necessary application may be executed on each OS.

<E. Example of Software Configuration of PLC>

Figure 4:
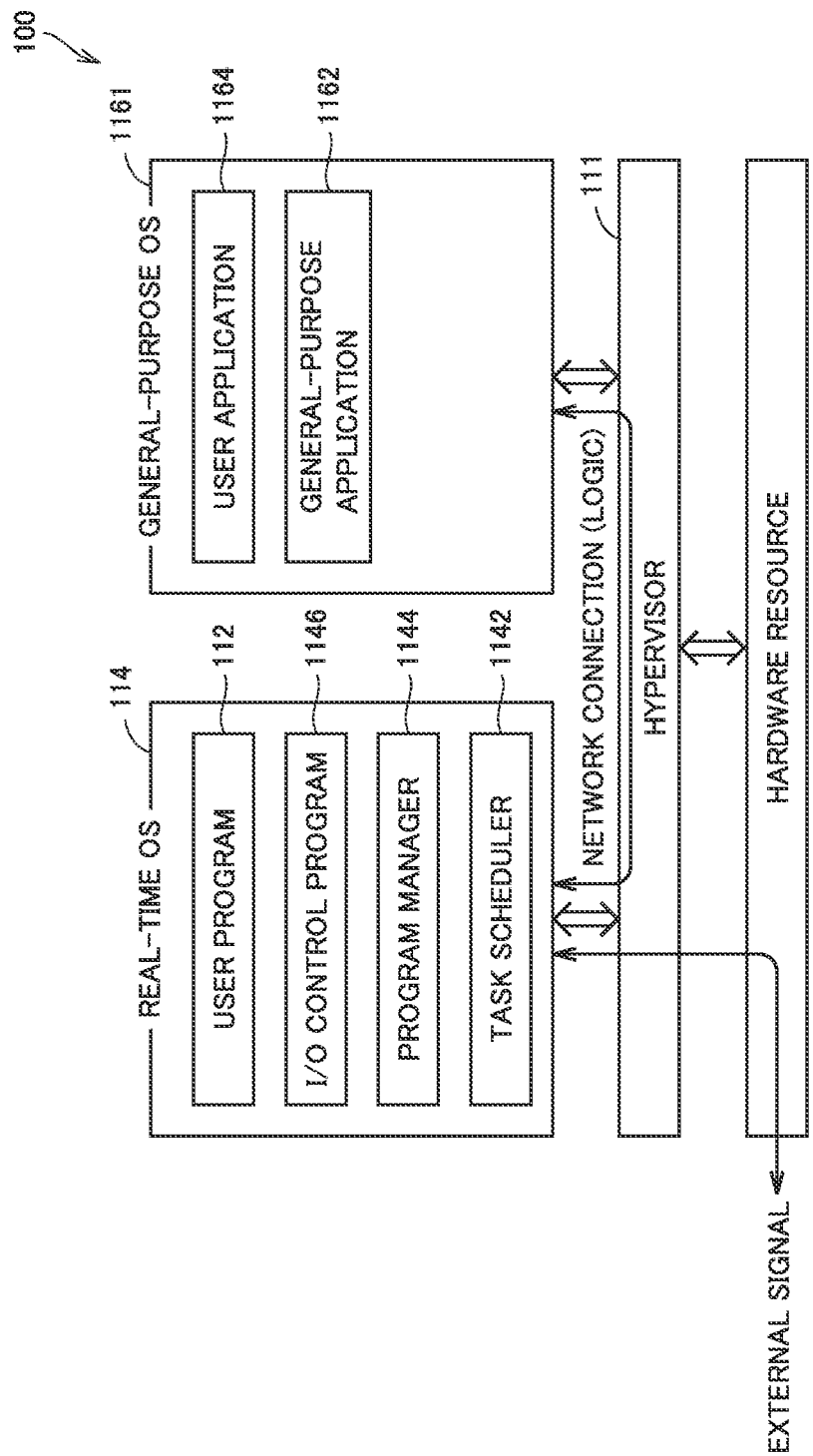
FIG. 4 is a diagram schematically illustrating an example of a software configuration of PLC 100 according to the embodiment of the present invention.

FIG. 4 is a diagram schematically illustrating an example of a software configuration of PLC 100 according to the embodiment of the present invention.

Referring to FIG. 4, in PLC 100, a hypervisor 111 manages hardware resources of PLC 100, and allocates the hardware resources to a real-time OS 114 and a general-purpose OS 1161 on an arbitration basis, so as to allow real-time OS 114 and general-purpose OS 1161 to run independent of each other on common hardware resources. That is, hypervisor 111 provides a virtualization environment where a plurality of different OSs run. A logical network is provided between real-time OS 114 and general-purpose OS 1161 via hypervisor 111.

On real-time OS 114, user program 112 including a sequence program is executed. For the execution of user program 112, a task scheduler 1142, a program manager 1144, and an input/output (I/O) control program 1146 operates in coordination with each other. User program 112 is converted into an executable form in advance, and this executable code repeats acquisition of a signal from the control target, execution of a control logic, and reflection of an execution result (control of an actuator) in coordination with task scheduler 1142, program manager 1144, and I/O control program 1146.

I/O control program 1146 is responsible for managing the exchange of various signals with the control target. Task scheduler 1142 controls an execution period or an execution timing for each task included in user program 112. According to the present embodiment, task scheduler 1142 executes, when a start timing based on the task execution period is reached, a task in response to a timing signal from program manager 1144. Details of the execution control using the timing signal from program manager 1144 will be described later.

On general-purpose OS 1161, any user application 1164 and general-purpose application 1162 are executed.

User application 1164 is typically an application created by a development vendor or the like of user program 112 executed on real-time OS 114 and executes processing of acquiring and/or providing data on a processing result of user program 112 and/or data necessary for processing.

General-purpose application 1162 is a standard application that is executable on general-purpose OS 1161 and is linked with user application 1164 to construct, with fewer man-hours, a system using general-purpose processing and functions.

<F. Example of Reference Between Software of PLC 100>

Figure 5:
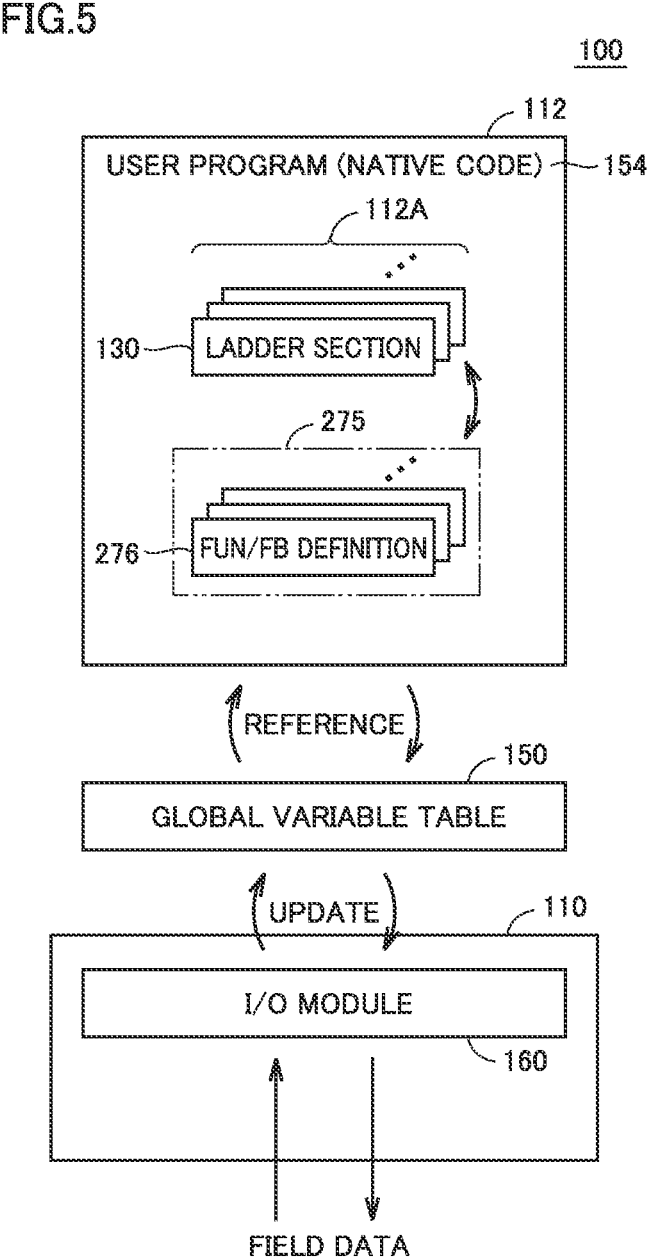
FIG. 5 is a diagram for describing an example of how to make reference to data between a user program 112 and a variable table in PLC 100 according to the embodiment of the present invention.

FIG. 5 is a diagram for describing an example of how to make reference to data between user program 112 and a variable table in PLC 100 according to the embodiment of the present invention.

Referring to FIG. 5, in order to execute the control program, PLC 100 executes system program 110 and user program 112. System program 110 includes an I/O module 160 as a part of its function. I/O module 160 maps data exchanged between the I/O unit and the field side where the control target device is installed to a global variable table 150.

PLC 100 is adapted to variable programming, and user program 112 can execute various types of processing using a variable mapped to field data defined in global variable table 150.

Sequence program 112A of user program 112 primarily includes a ladder section 130 and library 275. User program 112 represents native code 154 that is executable by processor 102.

Ladder section 130 includes a ladder program written in a ladder language. When a call instruction included in the ladder program is executed, FUN/FB definition 276 included in library 275 is called and executed, and a result of the execution is returned to a caller, namely, the ladder program.

<G. Example of Software Configuration of Support Device 200>

Figure 9:
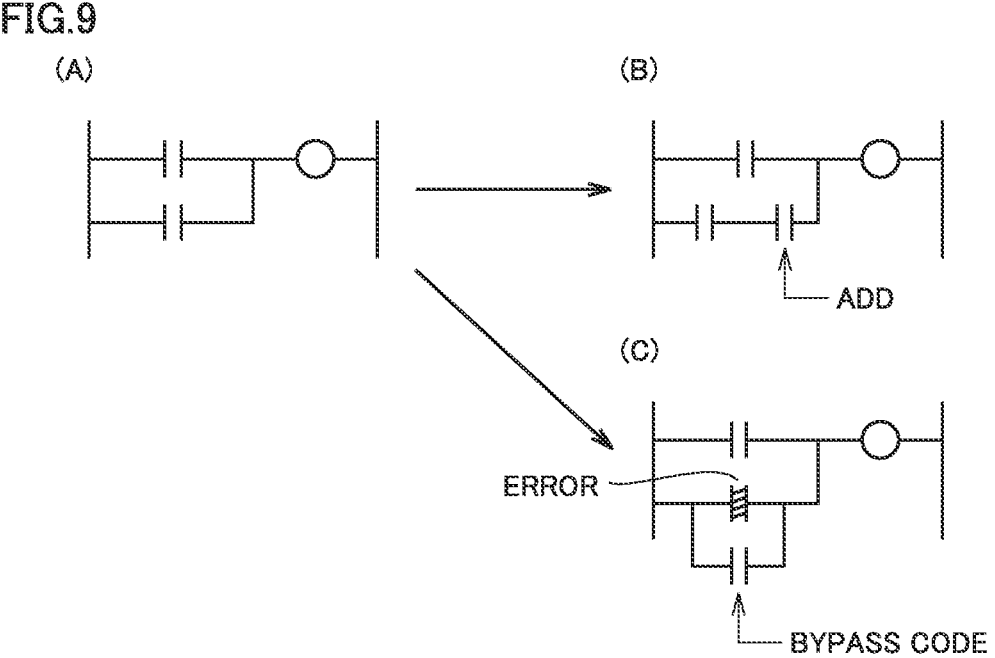
FIG. 9 is a diagram schematically illustrating an example of how to edit a sequence logic according to the embodiment of the present invention.

FIG. 6 is a diagram schematically illustrating an example of a software configuration of support device 200 according to the embodiment of the present invention. FIG. 6 illustrates an example of information stored in storage unit 201 in association with the software configuration of support device 200. FIG. 7 is a diagram schematically illustrating an example of a local flag table 273 according to the embodiment of the present invention. FIG. 8 is a diagram schematically illustrating an example of a definition flag table 274 according to the embodiment of the present invention. FIG. 9 is a diagram schematically illustrating an example of how to edit a sequence logic according to the embodiment of the present invention.

(g1. Information Stored in Support Device 200)

The information stored in storage unit 201 includes sequence program 271 that is program source code, intermediate code 272 generated from sequence program 271, local flag table 273, definition flag table 274, object code 2788, sequence circuit information 279, and definition circuit information 280.

Referring to FIG. 7, in local flag table 273, information on each FUN/FB definition 276 that is called by the call instruction in sequence program 271 and has its sequence logic (sequence circuit) deployed (hereinafter, also referred to as inline-deployed) in sequence program 271 is registered. The information corresponding to each FUN/FB definition 276 contains a call name 2731 that is a name (such as a POU) identifying FUN/FB definition 276, a location 2732 of a line where the call instruction of FUN/FB definition 276 appears in sequence program 271, and an asynchronous flag 2733 with call name 2731, location 2732, and asynchronous flag 2733 associated with each other.

Referring to FIG. 8, in definition flag table 274, for each FUN/FB definition 276 in library 275, a definition name 2741 that is an identifier (such as a POU name) of FUN/FB definition 276 and a definition asynchronous flag 2742 are registered with definition name 2741 and definition asynchronous flag 2742 associated with each other.

A description will be given below of asynchronous flag 2733 and definition asynchronous flag 2742. Support device 200 changes the sequence logic inline-deployed (expanded) in sequence program 271 in accordance with a user operation (hereinafter, referred to as local edit). Further, support device 200 changes the definition details of corresponding FUN/FB definition 276 in library 275 (hereinafter, referred to as definition edit). When such local edit or definition edit is made, a state where the sequence logic of FUN/FB definition 276 inline-deployed in sequence program 271 and the sequence logic of corresponding FUN/FB definition 276 in library 275 do not coincide with each other (hereinafter, also referred to as asynchronous) may occur, and when such asynchronization is canceled, both the sequence logics coincide with each other (hereinafter, also referred to as synchronous). Originally, both the sequence logics are synchronized with each other. Therefore, asynchronous flag 2733 is set to "1" set when the sequence logic inline-deployed in sequence program 271 is asynchronous, and is set to "0" when the sequence logic is synchronous. Likewise, definition asynchronous flag 2742 is set to "1" when the sequence logic defined by corresponding FUN/FB definition 276 is asynchronous, and is set to "0" when the sequence logic is synchronous.

Further, referring to FIG. 8, definition name 2741 of FUN/FB definition 276 in definition flag table 274 is associated with an option 277 (to be described below) set for a call instruction in sequence program 271.

Object code 2788, sequence circuit information 279, and definition circuit information 280 are used to display, on display 214, the sequence logic circuit represented by sequence program 271 that is the control program. Specifically, object code 2788 represents object code for implementing a screen display of the sequence logic circuit. Sequence circuit information 279 defines the sequence logic circuit configuration of sequence program 271. Definition circuit information 280 is generated from a sequence logic 2761 (to be described later) that is the definition details of FUN/FB definition 276 in library 275 and defines a circuit configuration represented by sequence logic 2761.

(g2. Module for Providing Development Support Environment)

Referring to FIG. 6, the support program for providing the development support environment includes a support program 700 that is executed to implement an online monitor including inline deployment, and a support program 710 that is executed to implement online edit. Support program 700 includes a program that implements operation reception unit 221 for receiving a user operation via operation unit 203, monitor 224, and the like. Support program 710 includes a program that implements operation reception unit 221, monitor 224, and the like. Such modules are each implemented by a program or a circuit, or a combination of a program and a circuit.

Editor 222 edits (creates) a user program including sequence program 271 in accordance with a user operation. Editor 222 includes an online editor 232. Online editor 232 provides an environment where the control program of PLC 100 or the like is edited without stopping the control target of PLC 100. That is, in many cases, it is not easy to stop the control target at a manufacturing site or the like where PLC 100 is operated. Under such a circumstance, even in a case where it is desired to partially change the control program executed by PLC 100, the control program cannot be changed unless PLC 100 is temporarily stopped, which makes usability poor. Therefore, online editor 232 enables the control program executed while PLC 100 is in operation to be partially modified (edited) in coordination with PLC 100.

Unlike online editor 232, editor 222 is also capable of editing the control program without depending on PLC 100 (or the operation state of PLC 100) (also referred to as offline edit). During the offline edit, editor 222 creates a user program including sequence program 271 in accordance with details of an operation received by operation reception unit 221. The program thus created is stored in storage unit 201 as sequence program 271 that is a source program. Further, during the offline edit, option setting module 2311 sets option 277 that instructs switching of the display mode for at least one call instruction selected from call instructions in sequence program 271 in accordance with details of a user operation.

Online editor 232 includes local editor 233 that enables the local edit and definition editor 234 that enables the definition edit.

FIG. 9 is a diagram schematically illustrating an example of edit according to the embodiment of the present invention. A description will be given with reference to FIG. 9 of a case where the sequence logic of sequence program 271 or sequence logic 2761 (to be described later) of FUN/FB definition 276 defines a circuit configuration as illustrated in (A) of FIG. 9. In this case, an image representing the circuit configuration of the sequence logic is displayed on display 214. The user can change, by manipulating the image using editor 222, sequence logic 2761 of the circuit illustrated in (A) of FIG. 9 to logic to which a new circuit is added as illustrated in (B) of FIG. 9 or (C) of FIG. 9, for example.

As an application example, for example, when the user determines that an error has occurred in a part of the circuit due to a failure in the control target based on a result of monitoring circuit output state 156 displayed by the online monitor, the displayed image is changed to add a circuit that bypasses a circuit element related to the failure as illustrated in (C) of FIG. 9. Note that an application example of edit by online editor 232 is not limited to error handling such as failure handling.

Builder 223 is an example of a "code converter". Builder 223 performs build processing (including parsing, optimization, compilation, and the like) on sequence program 271 to generate intermediate code 272. Support device 200 loads intermediate code 272 into PLC 100. Processor 102 of PLC 100 generates native code 154 from the intermediate code while referring to the definition details of FUN/FB definition 276 in library 275. Native code 154 is executable code that can be directly interpreted and executed by PLC 100. Intermediate code 272 is also code executable by PLC 100. In order to execute intermediate code 272, PLC 100 executes intermediate code 272 by, for example, interpreting the intermediate code line by line in accordance with an interpreter system. In the present embodiment, a description will be given of a case where PLC 100 executes native code 154.

Monitor 224 displays information on a result of execution of each module in the development support environment and sequence program 271 on display 214. When sequence program 271 is displayed on display 214, monitor 224 displays an image of an inline-deployed sequence circuit for a call instruction part for which option 277 is set, and an original call instruction is displayed for a call instruction part for which no option 277 is set. As described above, the user selects at least one call instruction of sequence program 271 and sets option 277 for the call instruction thus selected, so that FUN/FB definition 276 called by the call instruction can be inline-deployed and displayed during display of sequence program 271. Therefore, on the display screen of the logic of sequence program 271, it is possible to visualize a sequence logic (for example, the circuit configuration as illustrated in FIG. 9) of FUN/FB definition 276 called by at least one of the call instruction parts in sequence program 271 desired by the user.

Monitor 224 further includes online monitor module 238 for monitoring the execution state of PLC 100 with the sequence logic (sequence circuit) of sequence program 271.

Specifically, online monitor module 238 acquires circuit output state 156 indicating the execution state of native code 154 from PLC 100. That is, online monitor module 238 exchanges circuit output state 156 with PLC 100. Then, online monitor module 238 visualizes the execution state of sequence program 271 in PLC 100 using display 214 (that is, provides an online monitor) based on sequence circuit information 279, definition circuit information 280, and circuit output state 156 thus acquired. On the online monitor, when sequence program 271 has a circuit configuration inline-deployed, the execution state of the sequence logic is also visualized for the inline-deployed sequence circuit.

Such a configuration allows the user to monitor, using support device 200, the execution state of the user program including sequence program 271 executed by PLC 100 in real time.

<H. FUN/FB Definition and Call Instruction>

Figure 10:
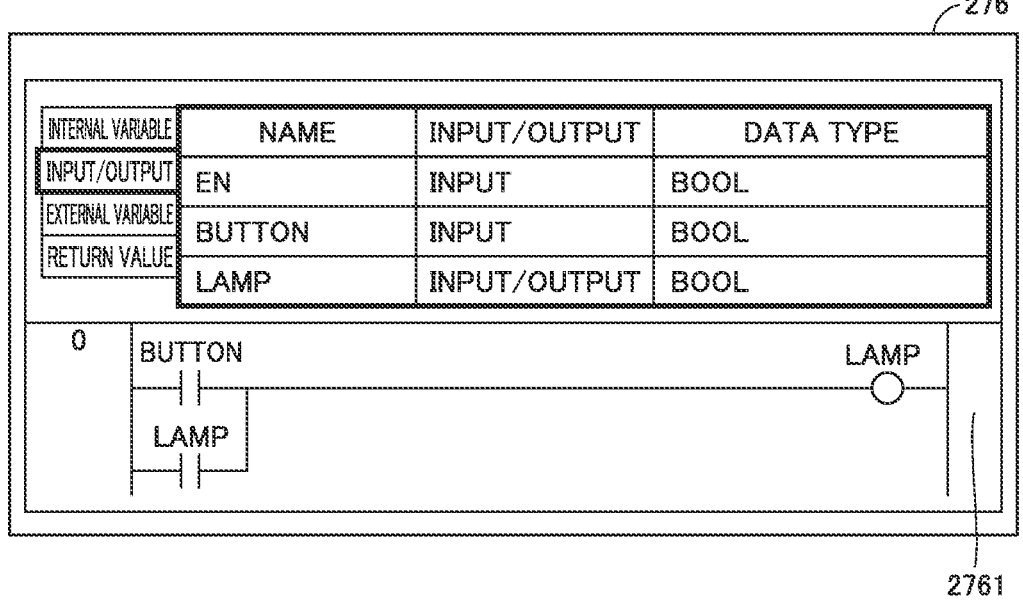
FIG. 10 is a diagram schematically illustrating a part of a FUN/FB definition 276 according to the embodiment of the present invention.

FIG. 10 is a diagram schematically illustrating a part of FUN/FB definition 276 according to the embodiment of the present invention. Referring to FIG. 10, FUN/FB definition 276 includes a variable name such as an argument used for operation of FUN or FB, definitions of input/output and a data type, and sequence logic 2761. When FUN/FB definition 276 (unit program) is called and executed, an operation according to sequence logic 2761 is executed using a value assigned to a defined variable. A result of the execution is output as a return value from the unit program.

Figure 11:
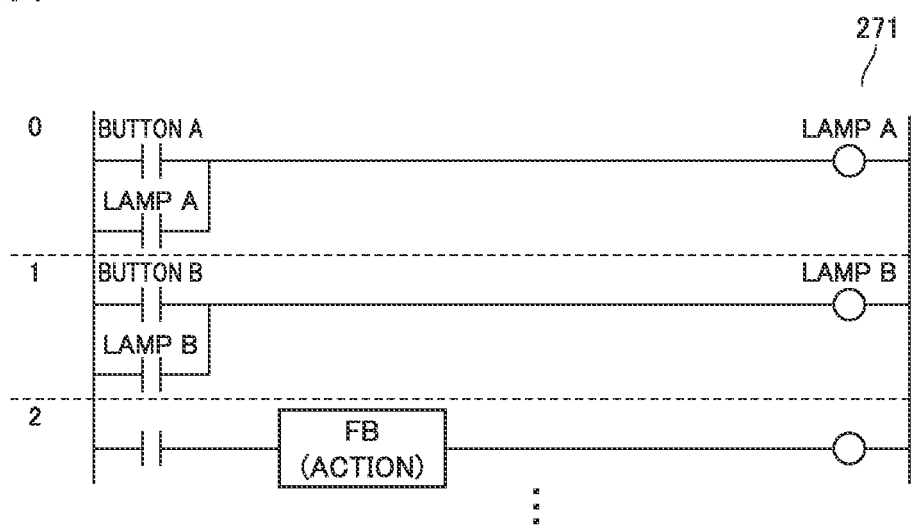
FIG. 11 is a diagram schematically illustrating a part of a sequence program 271 according to the embodiment of the present invention.
Figure 12:
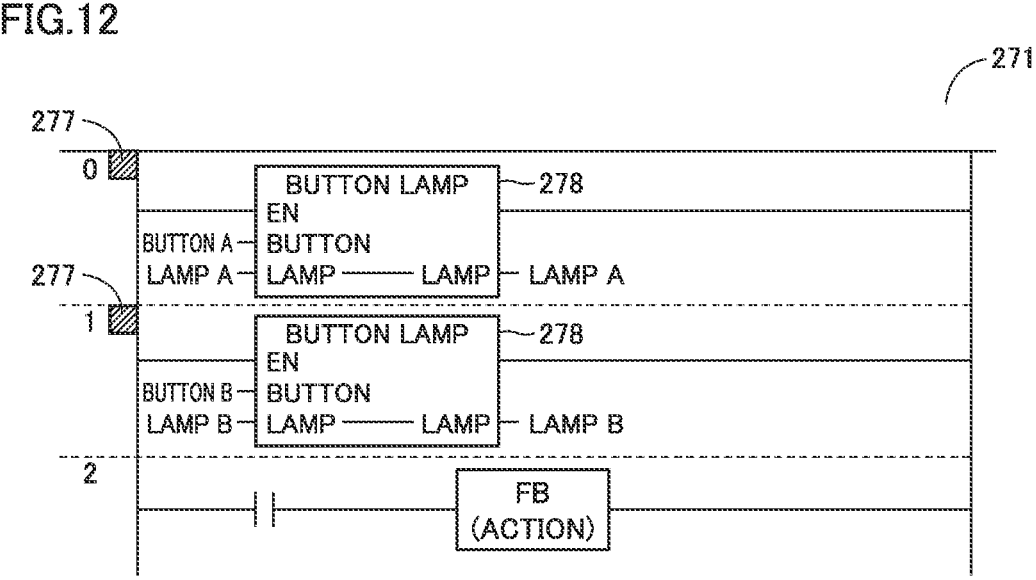
FIG. 12 is a diagram schematically illustrating an example of sequence program 271 using a call instruction of FUN/FB definition 276 according to the embodiment of the present invention.

FIG. 11 is a diagram schematically illustrating a part of sequence program 271 according to the embodiment of the present invention. FIG. 12 is a diagram schematically illustrating an example of sequence program 271 using a call instruction of FUN/FB definition 276 according to the embodiment of the present invention. Referring to FIG. 11, sequence program 271 includes, for example, instructions 0, 1, and 2. Since instruction 0 and instruction 1 are written as the same sequence logic, instructions 0, 1 can be replaced with a call instruction 278 of FUN/FB definition 276 illustrated in FIG. 10, which is a common component that defines the sequence logic (see FIG. 12).

Further, in sequence program 271 illustrated in FIG. 12, option 277 is set for instruction 0 and instruction 1 by option setting module 2311, but option 277 is not set for instruction 2. In this case, monitor 224 inline-deploys call instruction 278 of instruction 0 and instruction 1 for which option 277 is set. This causes an image of a circuit configuration based on sequence logic 2761 of the corresponding FUN/FB definition 276 to be displayed for call instruction 278 of instruction 0 and instruction 1.

<I. Overall Processing>

Figure 13:
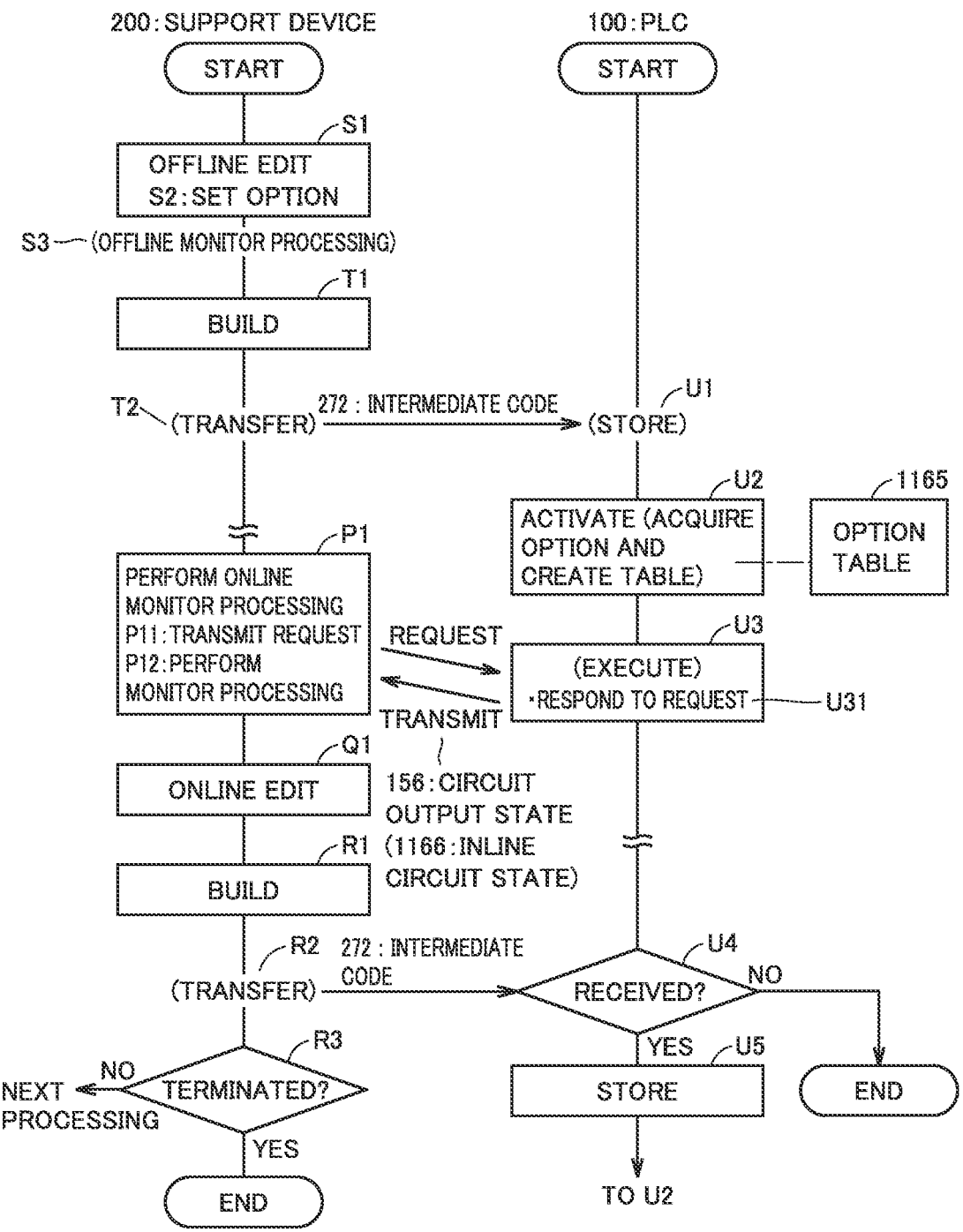
FIG. 13 is a flowchart illustrating an outline of processing according to the embodiment of the present invention.

FIG. 13 is a flowchart illustrating an outline of processing according to the embodiment of the present invention. In the flowchart illustrated in FIG. 13, processing in support device 200 and processing in PLC 100 are shown in association with each other.

Referring to FIG. 13, the user operates support device 200 to create a user program including sequence program 271 for PLC adapted to the control target (step S1). Specifically, editor 222 edits sequence program 271 by the offline edit in accordance with to a user operation, and stores sequence program 271 thus edited in storage unit 201. During the offline edit, option setting module 2311 sets option 277 for at least one call instruction in sequence program 271 selected in accordance with a user operation.

During edit, monitor 224 displays sequence program 271 on display 214 (step S3). Monitor 224 inline-deploys the call instruction for which option 277 is set. Therefore, during the offline edit, for the call instruction part for which option 277 is set, corresponding sequence logic 2761 (sequence circuit configuration) is visualized as an image. Here, input and output variable names declared in FUN/FB definition 276 inline-deployed are represented by parameter names specified at the call instruction part.

Note that, with sequence program 271 displayed, the call instruction for which option 277 is set is inline-deployed, but according to the present embodiment, option setting module 2311 further enables or disables option 277 already set for the call instruction in accordance with a user operation. This allows, for the call instruction part for which option 277 has already been set, switching between the display of sequence logic 2761 (sequence circuit configuration) inline-deployed (enabling option 277) or the display of the call instruction as it is (disabling option 277) in accordance with a selection operation made by the user.

Further, the user can perform, on inline-deployed FUN, an operation of assigning an instance name for monitoring (need not perform the assignment operation). Since FB has an instance name, such assignment is unnecessary. When the user performs the operation of assigning an instance name on inline-deployed FUN, the instance name is held in sequence program 271. Note that, when no instance name is assigned, any unique instance name is assigned at build time.

When the creation of sequence program 271 is completed, builder 223 is activated in response to a user operation to perform build processing (step T1). During the build processing, builder 223 generates intermediate code 272 and object code 2788 corresponding to sequence program 271. At this time, support device 200 also generates sequence circuit information 279 from sequence program 271. Sequence circuit information 279 is information for displaying, the information being used to provide an online monitor. Details of sequence circuit information 279 will be described later.

Support device 200 transfers intermediate code 272 corresponding to sequence program 271 to PLC 100 (step T2).

PLC 100 receives intermediate code 272 from support device 200 and stores intermediate code 272 (step U1). PLC 100 performs activation processing using intermediate code 272 thus received (step U2). At this time, PLC 100 generates, from intermediate code 272, an option table 1165 storing a set of a line of each call instruction for which the option is set and a definition name.

PLC 100 executes native code 154 (sequence program 271) (step U3). When PLC 100 executes sequence program 271 to perform the control processing on the control target, the following processing related to the online monitor is performed.

That is, the user instructs support device 200 to execute the online monitor. Online monitor module 238 is activated in response to the execution instruction received via operation reception unit 221. Online monitor module 238 performs the online monitor processing (step P1).

Online monitor module 238 requests PLC 100 to provide circuit output state 156 (step P11). In response to this request, user application 1164 of PLC 100 searches global variable table 150 based on the input/output variables of the sequence circuit defined in sequence program 271. This search causes circuit output state 156 indicating the execution state of running sequence program 271 (native code 154) to be acquired from global variable table 150. User application 1164 transmits circuit output state 156 thus acquired to support device 200 (step U31).

A value of circuit output state 156 includes a value of an inline circuit state 1166. Inline circuit state 1166 indicates a value of a state of a sequence circuit (that is, an inline-deployed sequence circuit) defined by sequence logic 2761 of each FUN/FB definition 276 for which option 277 is set in running sequence program 271. Inline circuit state 1166 includes, for each line that is indicated by option table 1165 and at which FUN/FB definition 276 is called, a line number and a value of a circuit output state of a sequence circuit defined by FUN/FB definition 276 called at the line.

Online monitor module 238 visualizes, on display 214, a sequence of sequence program 271 including the inline-deployed sequence circuit based on the sequence circuit information, circuit output state 156, and inline circuit state 1166 from PLC 100 (step P12). This implements the power flow display where the value of the circuit output state is reflected in the sequence circuit of entire sequence program 271 including the inline-deployed sequence circuit.

The user can check a state of running sequence program 271 in PLC 100 on the screen of display 214 provided by online monitor module 238.

According to the present embodiment, the sequence logic of the call instruction inline-deployed in sequence program 271 is displayed as "local variable name in FUN/FB definition" rather than "instance name.local variable name in FUN/FB definition". Therefore, online monitor module 238 acquires the current value of inline circuit state 1166 corresponding to "instance name.local variable name in FUN/FB definition" from PLC 100 based on the combination of "local variable name in FUN/FB definition" and the instance name, and performs the power flow display on the image of the inline-deployed sequence circuit.

Further, when the power flow display is performed in sequence program 271, online monitor module 238 may display a watch window on display 214, and output (instance name.local variable name in FUN/FB definition) and the current value on the watch window.

Further, support device 200 may request PLC 100 to transmit only inline circuit state 1166 so as to perform the power flow display only on image of the inline-deployed sequence circuit.

Further, online monitor module 238 may switch between a mode where the power flow display is performed on entire sequence program 271 and a mode where the power flow display is performed only on the image of the inline-deployed sequence circuit. This switching can be made in accordance with a user operation, for example.

When PLC 100 executes sequence program 271 to perform control processing on the control target, processing related to online the edit as described below can be performed.

That is, during the execution of sequence program 271 in PLC 100, operation reception unit 221 activates online editor 232 in response to the execution instruction received from the user (step Q1). Online editor 232 edits sequence program 271 in accordance with a user operation received via operation reception unit 221. At this time, the circuit output state value of the sequence circuit provided by the online monitor may become visualized support information for the user to determine a location where a sequence logic should be changed. From the visualized circuit output state value, for example, the user can determine a failure in the sequence circuit illustrated in (A) of FIG. 9 and change the failure spot thus determined to the sequence circuit illustrated in (B) of FIG. 9 or (C) of FIG. 9. Online editor 232 changes (edits) sequence program 271 in accordance with a user operation received via operation reception unit 221. Sequence program 271 thus changed is stored in storage unit 201.

Builder 223 is activated in response to a user operation. Builder 223 executes the build processing on sequence program 271 subjected to the online edit processing (step R1). Builder 223 stores intermediate code 272 obtained as a result of the build processing in storage unit 201 and transfers intermediate code 272 to PLC 100 (step R2).

After the transfer, support device 200 determines, for example, whether to terminate the processing in accordance with a user operation (step R3), and terminates the processing when determining to terminate the processing (YES in step R3). When it is determined that the processing is not terminated (NO in step R3), the processing proceeds to the next processing such as step P1.

PLC 100 determines whether to receive online-edited intermediate code 272 from support device 200 (step U4). When receiving intermediate code 272 from support device 200 (YES in step U4), PLC 100 stores intermediate code 272 thus received (step U5), and then proceeds to step U2. This enables the control of the control target in accordance with online-edited sequence program 271 and the online monitor processing to be performed.

When intermediate code 272 is not received (NO in step U4), the processing is terminated.

(i1. Online Edit Processing)

Figure 14:
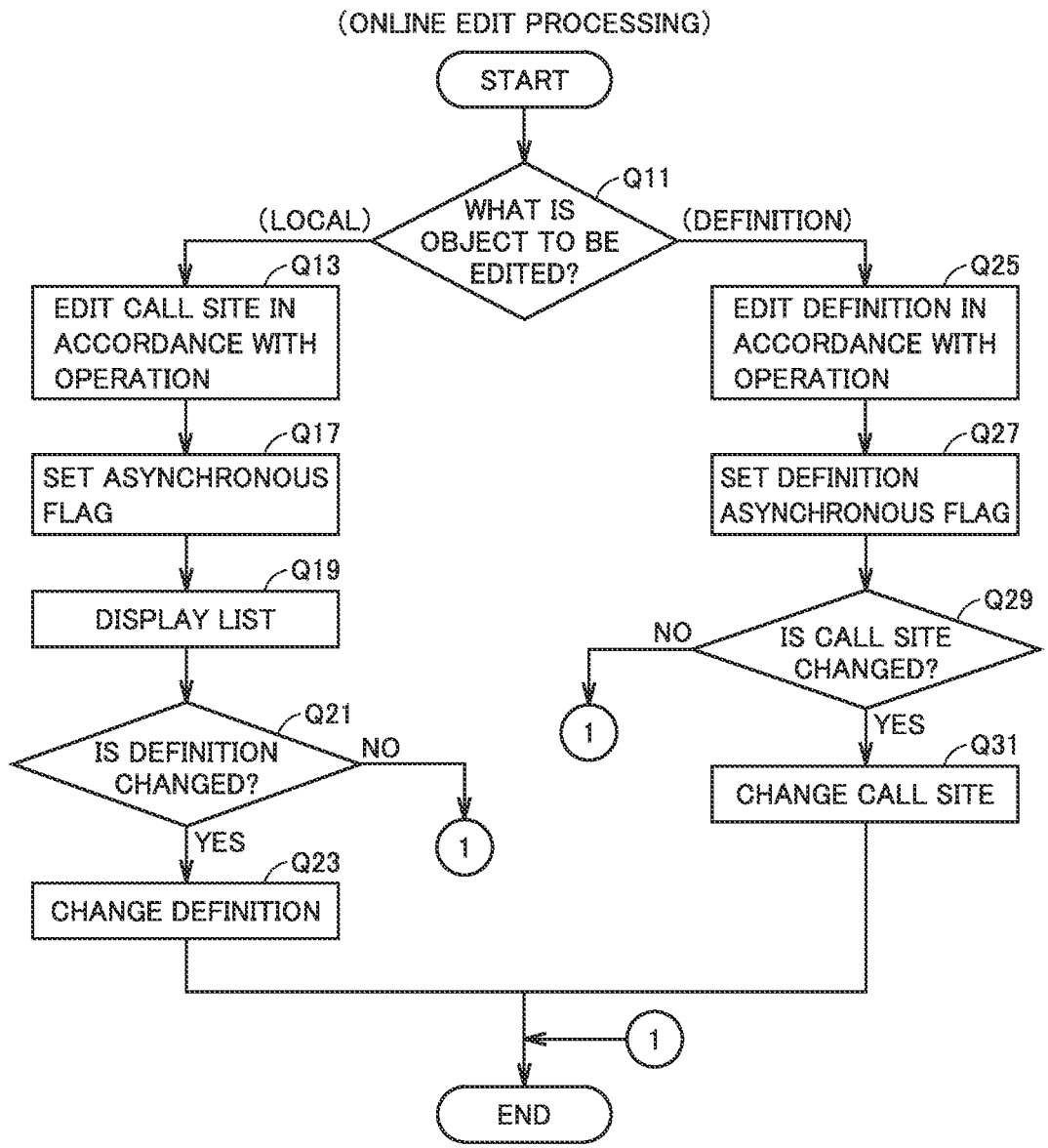
FIG. 14 is a flowchart for describing online edit processing according to the embodiment of the present invention.

FIG. 14 is a flowchart illustrating online edit processing according to the embodiment of the present invention. The online edit processing (step Q1) illustrated in FIG. 13 will be described in detail with reference to FIG. 14. Note that it is assumed that an object to be online-edited is a sequence logic inline-deployed at a call instruction part or FUN/FB definition 276 in library 275. The online-edit of the inline-deployed sequence logic or FUN/FB definition 276 includes creating or editing (adding, changing, deleting, or the like) a logic circuit configuration or an input/output variable.

First, when activated, online editor 232 determines whether the object to be edited is a local part (segment) of the inline-deployed sequence logic or the definition details of FUN/FB definition 276 based on a user operation received by operation reception unit 221 (step Q11).

When determining that it is a local part ((local part) in step Q11), online editor 232 edits at least one call instruction part in the inline-deployed sequence logic in accordance with the user operation (step Q13) and sets asynchronous flag 2733 in local flag table 273 to "1" (step Q17). Specifically, online editor 232 associates, with each call instruction part edited in step Q13, call name 2731 representing the name of FUN/FB definition 276 called at the call instruction part, location 2732 of a line where the call instruction is written, and asynchronous flag 2733, and registers them in local flag table 273. At the time of this register, online editor 232 sets asynchronous flag 2733 to "1".

Editor 222 instructs monitor 224 to display a list of asynchronous call instruction parts in sequence program 271 in accordance with a user operation (step Q19). Specifically, editor 222 scans sequence program 271 to output, to monitor 224, location information showing locations 2732 of call instructions having the asynchronous flag set to "1" among the call instructions indicated by locations 2732 in local flag table 273. Monitor 224 changes the call instruction part of each line indicated by the location information output from editor 222 to a predetermined display mode (for example, reverse display or the like) in sequence program 271 that has been displayed on display 214.

The above-described list display provides support information for the user to determine, among sequence logics inline-deployed in sequence program 271, a sequence logic to be reflected in the details of a corresponding FUN/FB definition 276.

Online editor 232 determines whether to change the details of FUN/FB definition 276 in accordance with a user operation received by operation reception unit 221 (step Q21). When online editor 232 determines not to change the definition details of FUN/FB definition 276 (NO in step Q21), the processing is terminated.

On the other hand, when determining to change the definition details of FUN/FB definition 276 (YES in step Q21), online editor 232 changes FUN/FB definition 276 in library 275 of PLC 100 (step Q23). Specifically, online editor 232 extracts call name 2731 associated with asynchronous flag 2733 set to "1" from local flag table 273. Online editor 232 searches library 275 based on call name 2731 thus extracted. FUN/FB definition 276 corresponding to call name 2731 is identified through the search, and the definition details of FUN/FB definition 276 thus identified are changed using the edited details received in step Q13. This change may also include making the definition details of FUN/FB definition 276 coincident with the edited (changed) details of the inline-deployed sequence logic (copying the edited (changed) details of the inline-deployed sequence logic). Online editor 232 changes asynchronous flag 2733 corresponding to the call instruction part subjected to the change from "1" to "0".

The processing returns to step Q11. On the other hand, when determining to edit FUN/FB definition 276 ((definition) in step Q11), online editor 232 changes the definition details of at least one FUN/FB definitions 276 in library 275 by editing the definition details in accordance with a user operation (step Q25), and sets definition asynchronous flag 2742 in definition flag table 274 to "1" (step Q27). Specifically, online editor 232 registers definition name 2741 that is the name of FUN/FB definition 276 edited in step Q25 and definition asynchronous flag 2742 in definition flag table 274 with definition name 2741 and definition asynchronous flag 2742 associated with each other. At the time of this register, online editor 232 sets definition asynchronous flag 2742 to "1".

Online editor 232 determines whether to change, in accordance with a user operation, the inline-deployed sequence logic corresponding to sequence program 271 based on the definition details of FUN/FB definition 276 thus changed (step Q29). When online editor 232 determines not to change (NO in step Q29), the processing is terminated.

On the other hand, when determining to change the inline-deployed sequence logic (YES in step Q29), online editor 232 updates the circuit of the inline-deployed sequence logic in sequence program 271 to make the sequence logic coincident with the changed definition details of a corresponding FUN/FB definition 276 (step Q31). Specifically, online editor 232 changes definition circuit information 280 using the changed definition details of FUN/FB definition 276. This causes definition circuit information 280 to be updated to information showing the sequence circuit configuration representing the changed definition details of FUN/FB definition 276. Further, online editor 232 instructs monitor 224 to update the display of the inline-deployed part. In response to the instruction, monitor 224 updates the image of the inline-deployed sequence circuit configuration in sequence program 271 using the definition circuit information 280 thus updated. In step Q31, online editor 232 sets all asynchronous flags 2733 registered in local flag table 273 to "0".

As described above, online editor 232 and monitor 224 collectively update the image of the inline-deployed sequence circuit configuration in sequence program 271 that has been displayed on display 214 to the image of the circuit configuration defined by the sequence logic of changed FUN/FB definition 276. This causes the image of the circuit configuration of the inline-deployed sequence logic to be updated to indicate the changed (edited) definition details of FUN/FB definition 276. When this update is made, it is also possible to provide visualization information that enables confirmation of relevance between a peripheral circuit and the circuit of the sequence logic in sequence program 271.

(i1-1. Specific Example of Local Edit)

In step Q23 illustrated in FIG. 14, any of the following two cases is applicable to the change of the definition details of FUN/FB definition 276. In a first case, when sequence program 271 includes a plurality of call instruction parts that are set asynchronous, for all the plurality of call instruction parts, the definition details of corresponding FUN/FB definitions 276 are changed. In a second case, not for all the plurality of call instruction parts but for at least one call instruction part selected from the plurality of call instruction parts in accordance with a user operation, the definition details of a corresponding FUN/FB definition 276 are changed.

For the second case, a description will be given of a case where, for the at least one call instruction part thus selected, the definition details of the corresponding FUN/FB definition 276 are changed. In this case, FUN/FB definitions 276 corresponding to the call instruction parts not selected in accordance with the user operation are not updated, and only a sequence logic inline-deployed at the call instruction part in sequence program 271 is changed. At this time, online editor 232 newly saves (overwrites) the sequence logic changed by the user in sequence program 271. Further, corresponding asynchronous flag 2733 in local flag table 273 is kept at "1" indicating the asynchronous state.

Builder 223 performs the build processing on sequence program 271 having the changed sequence logic. Builder 223 performs the build processing with the local variable name of the inline-deployed sequence logic that has not been updated of a corresponding FUN/FB definition 276 set as "instance name.local variable name in FUN/FB definition". Intermediate code 272 obtained as a result of the build processing is transferred to PLC 100. PLC 100 generates native code 154 based on intermediate code 272 received from support device 200, and PLC 100 executes sequence program 271 (native code 154). Online monitor module 238 of support device 200 receives circuit output state 156 from PLC 100 and performs the power line display on the inline-deployed sequence logic in the asynchronous state based on circuit output state 156 thus received. The user can acquire, from circuit output state 156 thus visualized, support information used for determining whether to update a corresponding FUN/FB definition 276 based on the inline-deployed sequence logic in the asynchronous state.

Note that, as the main use case of the local edit, according to the present embodiment, a case of application at the time of online edit is described, but the use case is not limited to online edit. Specifically, in a case where the inline-deployed details coincide with the definition details of a corresponding FUN/FB definition 276, when the user does not want to reflect the change made to FUN/FB definition 276 during online edit, the user can perform a predetermined operation to bring FUN/FB definition 276 into the asynchronous state.

(i2. Build Processing)

Figure 15:
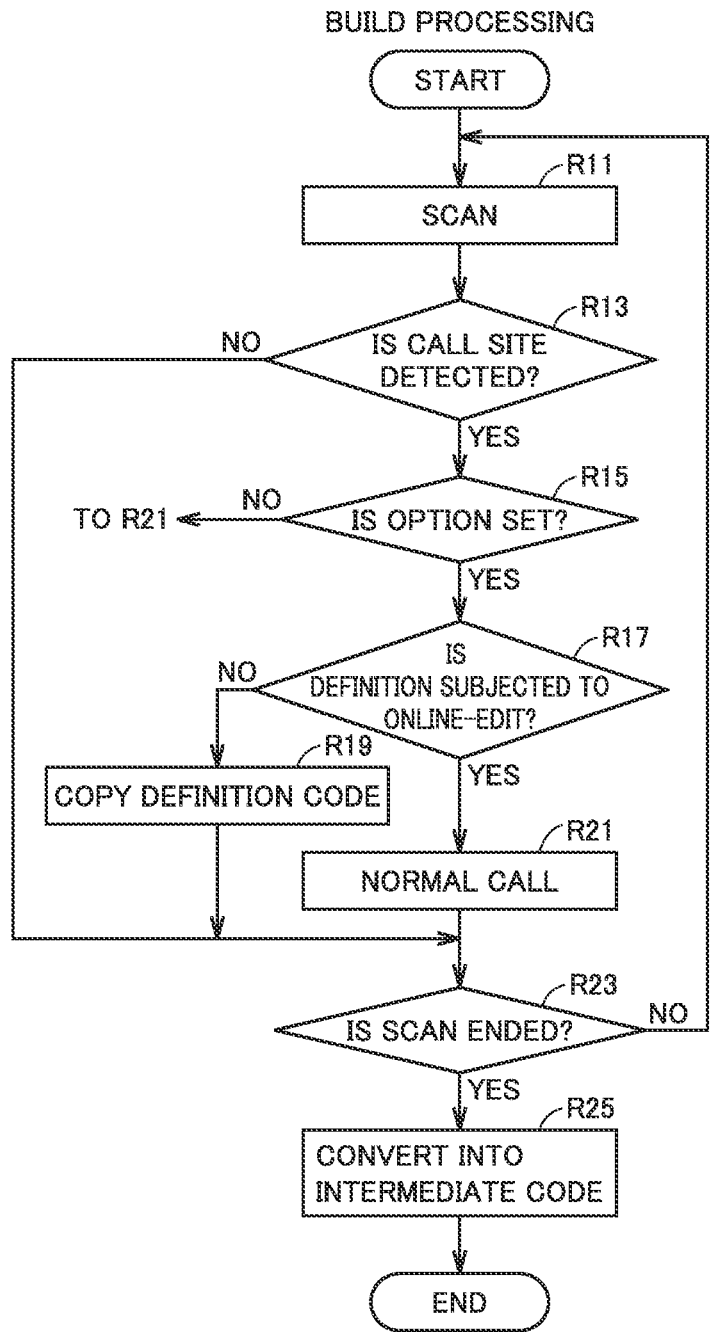
FIG. 15 is a flowchart for describing build processing according to the embodiment of the present invention.

FIG. 15 is a flowchart for describing build processing according to the embodiment of the present invention. A description will be given in detail of build processing (step R1) subsequent to the online edit illustrated in FIG. 13 with reference to FIG. 15. The description of the build processing illustrated in FIG. 15 will mainly focus on processing of a call instruction part.

Builder 223 scans sequence program 271 line by line from the top (step R11). When a call instruction part is detected through the scanning (YES in step R13), the processing proceeds to step R15, but when no call instruction part is detected (NO in step R13), the processing proceeds to step R23.

In step R15, builder 223 determines whether option 277 is set for the call instruction part (step R15). When it is determined that option 277 is not set for the call instruction part (NO in step R15), the processing proceeds to step R21. When it is determined that option 277 is set (YES in step R15), builder 223 determines whether FUN/FB definition 276 called by the call instruction part is being online-edited based on whether corresponding definition asynchronous flag 2742 in definition flag table 274 is "1" (step R17).

When it is determined that definition asynchronous flag 2742 is "1" and the online edit is ongoing (YES in step R17), the processing proceeds to step R21. In step R21, builder 223 assigns code of a predetermined (normal) call instruction to the call instruction part. When determining that definition asynchronous flag 2742 is "0", that is, the online edit is not ongoing (NO in step R17), builder 223 assigns code based on sequence logic 2761 of corresponding FUN/FB definition 276 to the call instruction part (step R19). For this assigned code, "instance name.local variable name in FUN/FB definition" is assigned to the local variable name defined by FUN/FB definition 276.

Builder 223 determines whether the scanning of all the lines of sequence program 271 is completed, and, when determining that the scanning is not completed (NO in step R23), returns to step R11. On the other hand, when determining that the scanning is completed (YES in step R23), builder 223 generates intermediate code 272 from sequence program 271 (step R25).

Steps R17, R21 in the above-described build processing will be further described. In step R17, when determining that corresponding definition asynchronous flag 2742 of FUN/FB definition 276 called at the call instruction part is "1" (YES in step R17), builder 223 assigns the code of the normal call instruction to the call instruction part (step R21), and performs the build processing. The normal call instruction allows the online-edited sequence logic of FUN/FB definition 276 to be executed. Further, a change can be made by online edit to the inline-deployed sequence logic (of the call instruction part for which option 277 is set).

(i3. Sequence Circuit Information)

Figure 20:
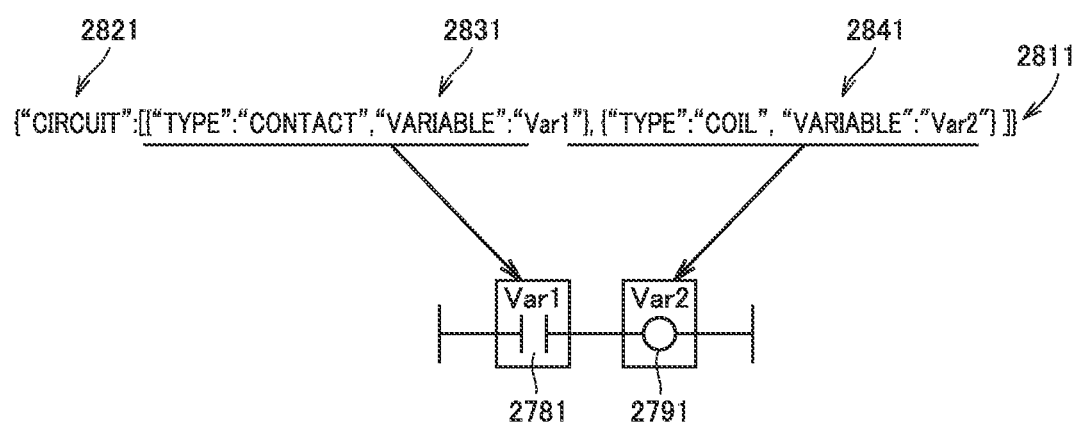
FIG. 20 is a diagram schematically illustrating an example of sequence circuit information according to the present embodiment.

FIG. 20 is a diagram schematically illustrating an example of sequence circuit information according to the present embodiment. Referring to FIG. 20, for example, information on circuit components included in each circuit defined by the user program for PLC is described.

FIG. 20 illustrates an example of a circuit including one contact 2781 and one coil 2791. In this example, a circuit definition 2811 of sequence circuit information 279 includes type information 2821 showing a type such as "circuit" and circuit component information 2831, 2841 showing circuit components included in each circuit. Circuit definition 2811 illustrated in FIG. 20 is repeated by the number of circuits defined by sequence program 271.

Likewise, for definition circuit information 280, a circuit definition is repeated by the number of circuit configurations defined by sequence logic 2761 of FUN/FB definition 276. Note that the description example of circuit definition 2811 illustrated in FIG. 20 is an example, and any format may be used.

<J. Program Execution Start Timing in PLC>

According to the present embodiment, when sequence program 271 (intermediate code 272) changed through the online edit is transferred to PLC 100, and PLC 100 executes sequence program 271 thus changed, the execution start timing can be set as desired.

Figure 16:
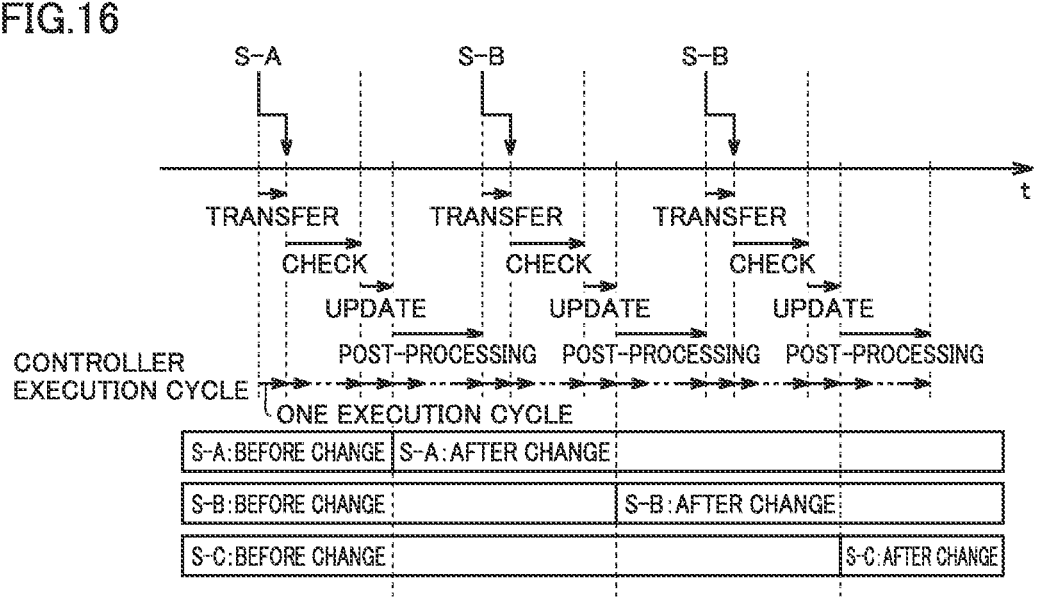
FIG. 16 is a diagram for describing an execution start timing of a control program transferred by an online edit function according to the embodiment of the present invention.

FIG. 16 is a diagram for describing an execution start timing of a control program transferred by the online edit function according to the embodiment of the present invention. This control program is a concept including sequence program 271. FIG. 16 illustrates an example of processing when three sequence programs 271 denoted by S-A, S-B, S-C are transferred.

FIG. 16 illustrates an example where, when the transfer of each sequence program 271 is completed, the execution of sequence program 271 of which the transfer is completed is started. In FIG. 16, each arrow indicates one task execution period used by task scheduler 1142. A step of "check" in FIG. 16 is executed by program manager 1144.

In the step of "check", program manager 1144 determines whether the reception of sequence program 271 transferred from support device 200 is completed in steps T2, R2 illustrated in FIG. 13. That is, a time required for the transfer varies in a manner that depends on various factors such as a variable size of edited sequence program 271. Even when there is such a variation in time, program manager 1144 outputs a reception completion timing signal to task scheduler 1142 when the reception of sequence program 271 by transfer is completed so as to maintain an execution cycle of a task based on sequence program 271 in PLC 100. Upon receipt of the timing signal from program manager 1144 and reach of the execution period, task scheduler 1142 brings sequence program 271 thus transferred into an executable state.

FIG. 16 illustrates a case where sequence program 271 is transferred, but, even in a case where FUN/FB definition 276 in library 275 is online-edited in support device 200 and then transferred to PLC 100, program manager 1144 detects the completion of reception and outputs the timing signal as in FIG. 16. Upon receipt of the timing signal from program manager 1144 and reach of the execution period, task scheduler 1142 brings FUN/FB definition 276 thus transferred into a callable state.

<K. Program>

A support program that provides the development support environment for executing the processing of each flowchart illustrated in the present embodiment is stored in storage unit 201 of support device 200. CPU 202 reads support program 700, 710 from storage unit 201 and executes support program 700, 710 to implement each part described in the present embodiment.

Alternatively, support program 700, 710 can also be provided as a program product with support program 700, 710 recorded in a computer-readable recording medium such as a flexible disk, a compact disk-read only memory (CD-ROM), a ROM, a RAM, or recording medium 250 attached to support device 200. Recording medium 250 is a medium that stores information such as the program by electrical, magnetic, optical, mechanical, or chemical action in a manner as to allow a computer, another device, a machine, or the like to read the information thus recorded.

Support program 700, 710 can also be provided with support program 700, 710 recorded in a recording medium such as an HDD 208 built into support device 200. The program can also be provided by being downloaded from a network (not illustrated) via a communication interface.

<L. Advantages>

Figure 17:
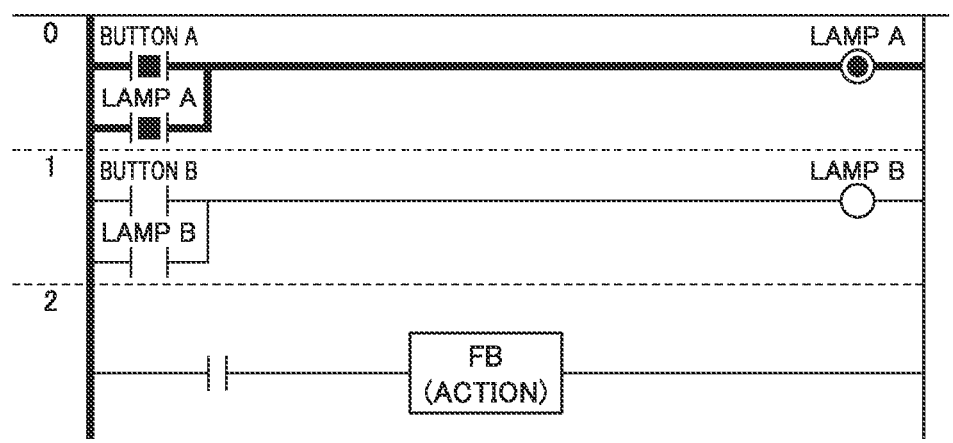
FIG. 17 is a diagram for describing advantages brought about by a development support environment according to the embodiment of the present invention.
Figure 18:
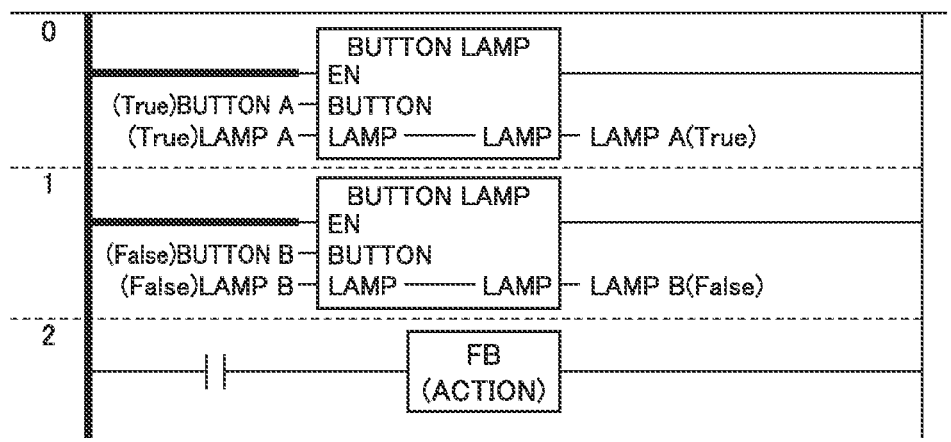
FIG. 18 is a diagram for describing advantages brought about by the development support environment according to the embodiment of the present invention.
Figure 19:
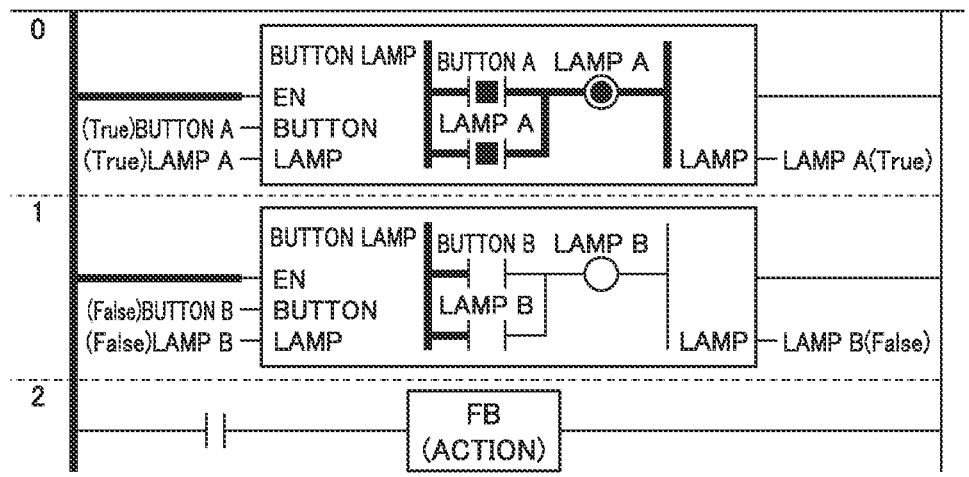
FIG. 19 is a diagram for describing advantages brought about by the development support environment according to the embodiment of the present invention.

FIGS. 17, 18, and 19 are diagrams for describing advantages brought about by the development support environment according to the embodiment of the present invention. FIGS. 17 to 19 illustrate examples of sequence program 271 that outputs, when executed, the same execution result. In FIGS. 17 to 19, the power flow display showing the output of the execution result is represented by a thick line.

Specifically, in FIG. 17, sequence logics are described for instruction 0 and instruction 1, so that it is easy to grasp the power flow, but there is a demand for making the same sequence logics into a component in terms of program development efficiency. FIG. 18 illustrates a case that meets the demand, and for instruction 0 and instruction 1, FUN/FB definition 276 (component) that defines the sequence logic is replaced with a call instruction to be called and executed from library 275. In FIG. 18, editing FUN/FB definition 276 (component) in library 275 allows the edited details to be simultaneously reflected in instruction 0 of sequence program 271 and FUN/FB definition 276 (component) called by instruction 1.

For instruction 0 and instruction 1 illustrated in FIG. 18, however, the common call instruction is displayed in a component image where no internal sequence logic is described, but there is a demand for confirming the power line indicating the execution result of the sequence logic in the component. Further, there is also a demand for not changing the sequence logic of instruction 1 even when the sequence logic of instruction 0 is changed. FIG. 19 illustrates sequence program 271 that can be created by a development support environment according to the present embodiment that meets both the demands.

In FIG. 19, instruction 0 and instruction 1 indicate call instructions that call the same FUN/FB definition 276, but in their respective call instruction parts, sequence logic 2761 of FUN/FB definition 276 is inline-deployed. Online monitor module 238 performs the power line display indicating the result of the execution of the inline-deployed sequence logic. Furthermore, as described in (i1-1. Specific example of local edit), even when the inline-deployed sequence logic of instruction 0 is edited by online editor 232, it is also possible not to change the sequence logic of instruction 1 based on the edited details.

<M. Modification>

A modification according to the embodiment of the present invention will be described.

According to the present embodiment, support device 200 compares the asynchronous sequence logic inline-deployed in sequence program 271 with the definition details (sequence logic 2761 and the like) of corresponding FUN/FB definition 276 in library 275 as a source program, and outputs information showing the difference.

Further, according to the present embodiment, when the inline-deployed sequence logic is changed through edit, the sequence logic thus changed is added to sequence program 271 as a complete local logic independent of corresponding FUN/FB definition 276 in library 275. At this time, support device 200 merges the local variable of corresponding FUN/FB definition 276 into the variable table of the call instruction code part of corresponding FUN/FB definition 276.

Furthermore, the development support environment according to the present embodiment includes monitor 224, but may be a development support environment that does not require monitor 224 as an essential component. That is, it may be provided as a development support environment including at least editor 222 (more specifically, local editor 233).

Local editor 233 is responsible for performing processing on a component (FUN/FB definition 276) inline-deployed in sequence program 271. On the other hand, when the number of components to be inline-deployed increases, the number of variables written in sequence program 271 increases, and such an increase leads to an increase in memory usage. In order to cope with such an increase in memory usage, shortening the variable name to "local variable name in FUN/FB definition" rather than writing the variable name as "instance name.local variable name in FUN/FB definition" makes it possible to suppress an increase in memory usage with an increase in the number of variables. Further, builder 223 does not use inline deployment during synchronization, and performs inline deployment only when a local change is made by local editor 233 and performs the build processing, so that the number of steps of sequence program 271 to be built can be reduced.

<N. Appendix>

The present embodiment as described above includes the following technical ideas.

[Configuration 1]

A support device (200) that supports development of a sequence program executed by a control device (100) that controls a control target (10090) includes:

an operation reception unit (221) configured to receive an operation on the support device; and a setting unit (2311) configured to set a switching option of a display mode for at least one call instruction selected from call instructions of a unit program in the sequence program in accordance with the operation received, and when the sequence program is displayed, the at least one call instruction is switched to an image of a circuit configuration represented by a sequence logic defined by a corresponding unit program based on the option set and displayed.

[Configuration 2]

The support device according to configuration 1 further includes a monitor (238) configured to acquire a circuit output state (156) indicating an execution state of the sequence program from the control device and visualize the execution state of the sequence program in the control device based on sequence circuit information defining a circuit configuration of the sequence program and the circuit output state acquired.

[Configuration 3]

In the support device according to configuration 2, the circuit output state (156) includes a circuit output state (1166) indicating an execution state of the at least one unit program selected, and the monitor visualizes the circuit output state indicating the execution state of the at least one unit program in the image of the circuit configuration of the unit program.

[Configuration 4]

The support device according to configuration 3 further includes an editor (222) configured to edit the sequence program, and the editor edits the sequence logic defined by the unit program based on an operation of changing the image of the circuit configuration of the unit program.

[Configuration 5]

In the support device according to any one of configurations 1 to 4, the option set for the at least one call instruction is enabled or disabled in accordance with the operation received.

[Configuration 6]

The support device according to any one of configurations 1 to 5 further includes an editor (222) configured to edit the sequence program, and the setting unit sets the switching option when the sequence program is edited.

[Configuration 7]

A support program (700) for supporting development of a sequence program (271) executed by a control device that controls a control target causes a computer (200) to execute:

receiving an operation on the computer;

setting a switching option of a display mode for at least one call instruction selected from call instructions of a unit program in the sequence program in accordance with the operation received, and switching, when the sequence program is displayed, the at least one call instruction to an image of a circuit configuration represented by a sequence logic defined by a corresponding unit program based on the option set and displaying switched the image of a circuit configuration.

It should be understood that the embodiments disclosed herein are illustrative in all respects and not restrictive. The scope of the present invention is defined by the claims rather than the above description and is intended to include the claims, equivalents of the claims, and all modifications within the scope.

REFERENCE SIGNS LIST

100: PLC, 112A, 271: sequence program, 130: ladder section, 150: global variable table, 154: native code, 156: circuit output state, 279: sequence circuit information, 200: support device, 221: operation reception unit, 222: editor, 223: builder, 224: monitor, 277: option, 232: online editor, 233: local editor, 234: definition editor, 238: online monitor module, 272: intermediate code, 273: local flag table, 274: definition flag table, 275: library, 276: FUN/FB definition, 278: call instruction, 280: definition circuit information, 1142: task scheduler, 1144: program manager, 1165: option table, 2761: sequence logic

The invention claimed is:

1. A support device that supports development of a sequence program executed by a control device that controls a control target, the support device comprising:
   a storage unit;
   an operation reception unit configured to receive an operation on the support device; and
   a setting unit configured to set a switching option of a display mode for at least one call instruction selected from call instructions of a unit program in the sequence program in accordance with the operation received, wherein
   when the sequence program is displayed, the at least one call instruction is switched to an image of a circuit configuration represented by a sequence logic defined by a corresponding unit program based on the option set and displayed.

2. The support device according to claim 1, further comprising a monitor configured to acquire a circuit output state indicating an execution state of the sequence program from the control device and visualize the execution state of the sequence program in the control device based on sequence circuit information defining a circuit configuration of the sequence program and the circuit output state acquired.

3. The support device according to claim 2, wherein
   the circuit output state includes a circuit output state indicating an execution state of the at least one unit program selected, and
   the monitor visualizes the circuit output state indicating the execution state of the at least one unit program in the image of the circuit configuration of the unit program.

4. The support device according to claim 3, further comprising an editor configured to edit the sequence program, wherein
   the editor edits the sequence logic defined by the unit program based on an operation of changing the image of the circuit configuration of the unit program.

5. The support device according to claim 1, wherein
the option set for the at least one call instruction is enabled or disabled in accordance with the operation received.

6. The support device according to claim 1, further comprising an editor configured to edit the sequence program, wherein
the setting unit sets the switching option when the sequence program is edited.

7. A non-transitory computer-readable storage medium storing a program for causing a computer to execute a method for supporting development of a sequence program executed by a control device that controls a control target, the method comprising:
receiving an operation on the computer;
setting a switching option of a display mode for at least one call instruction selected from call instructions of a unit program in the sequence program in accordance with the operation received; and
switching, when the sequence program is displayed, the at least one call instruction to an image of a circuit configuration represented by a sequence logic defined by a corresponding unit program based on the option set and displaying switched the image of a circuit configuration.

* * * * *